United States Patent
Yamasaki et al.

(10) Patent No.: US 7,307,941 B2
(45) Date of Patent: Dec. 11, 2007

(54) OPTICAL RECORDING MEDIUM HAVING SUBSTANTIALLY UNIFORM INTERLAYER STRUCTURE

(75) Inventors: Takeshi Yamasaki, Kanagawa (JP); Tomomi Yukumoto, Chiba (JP)

(73) Assignee: Sony Corporation, Tokyo (JP)

( * ) Notice: Subject to any disclaimer, the term of this patent is extended or adjusted under 35 U.S.C. 154(b) by 508 days.

(21) Appl. No.: 10/478,066

(22) PCT Filed: Mar. 20, 2003

(86) PCT No.: PCT/JP03/03456

§ 371 (c)(1),
(2), (4) Date: May 3, 2004

(87) PCT Pub. No.: WO03/079341

PCT Pub. Date: Sep. 25, 2003

(65) Prior Publication Data

US 2004/0179463 A1  Sep. 16, 2004

(30) Foreign Application Priority Data

Mar. 20, 2002 (JP) .............................. 2002-079549

(51) Int. Cl.
*G11B 17/00* (2006.01)
*B32B 9/00* (2006.01)
(52) U.S. Cl. .................... 369/257; 428/64.1; 428/64.4; 428/64.6
(58) Field of Classification Search ............... 369/275.4
See application file for complete search history.

(56) References Cited

U.S. PATENT DOCUMENTS 3,993,815 A  11/1976  Douek et al.
5,681,634 A * 10/1997  Miyamoto et al. ......... 428/64.6
5,858,498 A *  1/1999  Ohkubo et al. ............. 428/64.1
6,078,561 A *  6/2000  Kakinuma .................. 369/286
6,083,598 A *  7/2000  Ohkubo et al. ............. 428/64.1
6,136,133 A   10/2000  Maruyama et al.
6,224,702 B1 *  5/2001  Kitano et al. ................. 156/74

(Continued)

FOREIGN PATENT DOCUMENTS

JP        01285321      11/1989

(Continued)

*Primary Examiner*—Angel Castro
*Assistant Examiner*—Christopher R. Magee
(74) *Attorney, Agent, or Firm*—Robert J. Depke; Rockey, Depke & Lyons, LLC.

(57) ABSTRACT

An optical recording medium capable of suppressing film thickness irregularity of interlayer between a plurality of optical recording layers and effects of warps of a transfer substrate and arising of dusts and burrs problems, etc. and a method of producing the optical recording medium are provided. An optical recording medium has a structure wherein at least two optical recording layers (11, 13) stacked via an interlayer 12 and a light transmitting layer 14 provided on the optical recording layer are provided at least one surface of a medium substrate 10, for performing recording and reproducing by irradiating a light to the optical recording layers (11, 13) through the light transmitting layer 14, and the interlayer includes at least one layer of ultraviolet curing resin film made to be a film in advance and is a film formed with an uneven shape corresponding to a recording pit or an uneven shape (12p) to be a guide groove on its surface and cured.

7 Claims, 22 Drawing Sheets

U.S. PATENT DOCUMENTS

| | | |
|---|---|---|
| 6,267,578 B1 * | 7/2001 | Kakinuma .................. 425/175 |
| 6,444,076 B1 | 9/2002 | Herndon et al. |
| 6,503,423 B1 * | 1/2003 | Kitano et al. .............. 264/1.33 |
| 6,521,315 B1 * | 2/2003 | Zaiss ........................ 428/64.1 |
| 6,537,423 B1 * | 3/2003 | Ebisawa et al. ......... 156/379.6 |
| 6,613,396 B1 * | 9/2003 | Nishida et al. ............. 427/512 |

FOREIGN PATENT DOCUMENTS

| | | |
|---|---|---|
| JP | 02-190245 | 7/1990 |
| JP | 03-225644 | 10/1991 |
| JP | 09-091773 | 4/1997 |
| JP | 9-161318 A | 6/1997 |
| JP | 10-222870 A | 8/1998 |
| JP | 2001-357561 A | 12/2001 |
| JP | 2003-67984 A | 3/2003 |
| WO | WO 00/18531 | 4/2000 |

* cited by examiner

OPTICAL RECORDING MEDIUM HAVING SUBSTANTIALLY UNIFORM INTERLAYER STRUCTURE

This application claims priority to Japanese Patent Application Number JP2002-079549, filed Mar. 20, 2002, which is incorporated herein by reference.

TECHNICAL FIELD

The present invention relates to an optical recording medium (hereinafter, also referred to as an optical disk) and particularly relates to a multilayer optical disk having a plurality of optical recording layers.

BACKGROUND ART

In recent years, in the information recording field, studies on an optical information recording method have been pursued in various places. This optical information recording method has advantages of being able to record and reproduce in a non-contact way and to be compatible with respective memory formats of a read-only type, a recordable type and a rewritable type, and a wide use range from industrial use to consumer use is considered as a method of realizing a large capacity file at a low cost.

A large capacity of an optical recording medium (hereinafter, also referred to as an optical disk) for the various optical information recording methods as above has been attained by making a spot size on a focal surface small by making a wavelength of a laser light as a light source to be used in the optical information recording method short and adopting an objective lens having a large numerical aperture.

For example, a CD (compact disk) has a laser light wavelength of 780 nm, the numerical aperture (NA) of an objective lens of 0.45 and a recording capacity of 650 MB, while a DVD-ROM (digital versatile disk read-only memory) has a laser light wavelength of 650 nm, the NA of 0.6 and a recording capacity of 4.7 GB.

Furthermore, in an optical disk system of the next generation, a large capacity of 22 GB or more has been studied by attaining a laser light wavelength of 450 nm or less and the NA of 0.78 or more by using an optical disk wherein a thin light transmitting protective film (a cover layer) of, for example, 100 μm or so is formed on an optical recording layer.

As a method of obtaining a still higher density, a multilayer optical disk wherein two or more optical recording layers are stacked in the vertical direction via a physical interlayer has been developed. Below, an optical disk having a plurality of optical recording layers as such will be also called a multilayer optical disk and an optical disk having one optical recording layer will be also called a single layer optical disk.

In an optical disk system wherein a laser light wavelength is made short and the numerical aperture of an objective lens is made large for attaining a large capacity as above, there are disadvantages that spherical aberration is liable to occur and a focal depth becomes shallow, etc., and the light transmitting layer is demanded that the film thickness does not become out of a predetermined value and a film thickness irregularity is small.

In a multilayer disk made by stacking optical recording layers in the vertical direction, not only the light transmitting layer, but the interlayer is also demanded to have a predetermined film thickness and a small irregularity of the film thickness in the same way.

As a method of forming the interlayer provided between the optical recording layers, conventionally, a method of forming a predetermined film thickness by spin-coating using an ultraviolet curing resin to secure necessary properties for recording and reproducing has been general.

However, in the method of forming the interlayer by spin-coating using an ultraviolet curing resin as above, there was a disadvantage that irregularity of the film thickness is liable to occur on inner and outer circumferences of the optical disk and the improvement has been demanded.

Furthermore, there have been disadvantages of being susceptible to the influence of warps of a disk substrate and a transfer substrate and having a weakness for dusts and burrs.

DISCLOSURE OF THE INVENTION

The present invention was made in consideration of the above circumstances and has as an object thereof to provide an optical recording medium having a plurality of optical recording layers, capable of suppressing irregularity of a film thickness of an interlayer between the optical recording layers and, moreover, capable of suppressing the influence by warps of a transfer substrate and arising of problems due to dusts and burrs, and a method of producing such an optical recording medium.

To attain the above object, an optical recording medium of the present invention has at least two optical recording layers stacked via an interlayer and a light transmitting layer provided on the optical recording layer on at least one surface of a medium substrate and is for performing recording and reproducing by irradiating a light to the optical recording layer through the light transmitting layer, wherein the interlayer includes at least one layer of ultraviolet ray curing resin film made to be a film in advance and is a film formed with an uneven shape corresponding to a recording pit or an uneven shape to be a guide groove on its surface and cured.

In the optical recording medium of the above present invention, preferably, the interlayer is a film obtained by curing a stacked structure including at least one layer of ultraviolet ray curing resin film made to be a film in advance and at least one layer of a coating film of an ultraviolet ray curing liquid resin composition.

Furthermore preferably, an uneven shape corresponding to a recording pit or an uneven shape to be a guide groove on the surface of the resin film in the interlayer.

Also furthermore preferably, an uneven shape corresponds to a recording pit or an uneven shape to be a guide groove on the surface of the coating film of an ultraviolet ray curing liquid resin composition.

In the optical recording medium of the above present invention, the interlayer provided between the plurality of optical recording layers includes at least one ultraviolet curing resin film made to be a film in advance and an uneven shape corresponding to a recording pit or an uneven shape to be a guide groove is formed on the surface of the interlayer.

The resin film made to be a film in advance has small film thickness irregularity, and by using this as a part or all of the interlayer, film thickness irregularity of the interlayer can be suppressed.

Also, by using a resin film made to be a film in advance, the influence of warps of the transfer substrate and arising of problems caused by dusts and burrs can be also suppressed.

Also, to attain the above object, a method of producing an optical recording medium of the present invention is a method of producing an optical recording medium having at least two optical recording layers, including a step of forming a medium substrate having an uneven shape on its one surface, a step of forming a first optical recording layer on the uneven shape formation surface of the medium substrate, a step of forming an interlayer having an uneven shape on its surface on the first optical recording layer, a step of forming a second optical recording layer on the uneven shape formation surface of the interlayer, and a step of forming a light transmitting protective layer on the second optical recording layer; wherein the step of forming the interlayer includes a step of adhering one surface of an ultraviolet ray curing resin film made to be a film in advance to the first optical recording layer or a transfer substrate formed with an uneven shape, a step of pressing the transfer substrate or the first optical recording layer directly or via other layer against the resin film and providing an uncured interlayer including at least one layer of the resin film between the first optical recording layer and the transfer substrate, a step of curing the interlayer in a state of pressing the transfer substrate against the surface of the interlayer, and a step of releasing the transfer substrate from the interlayer and transferring the uneven shape of the transfer substrate to the surface of the interlayer.

In the method of producing an optical recording medium of the above present invention, preferably, the resin film is an ultraviolet ray curing resin film made to be a film in a state of being sandwiched by a pair of release films; and the step of forming the interlayer further includes a step of releasing one of the release films from the resin film before the step of adhering the resin film to the first optical recording layer or the transfer substrate, and a step of releasing the other of the release films from the resin film after the step of adhering the resin film to the first optical recording layer or the transfer substrate and before the step of pressing the transfer substrate or the first optical recording layer directly or via other layer against the resin film.

In the method of producing an optical recording medium of the above present invention, preferably, the interlayer is formed only with the resin film in the step of forming the interlayer.

In the method of producing an optical recording medium of the above present invention, preferably, the step of forming the interlayer includes a step of adhering the resin film on the transfer substrate, a step of forming a coating film of an ultraviolet ray curing liquid resin composition on the first optical recording layer, a step of adhering the resin film and the coating film, a step of obtaining the interlayer by during the resin film and the coating film in a state of being adhered to each other, and a step of releasing the transfer substrate from the interlayer.

Also, in the method of producing an optical recording medium of the above present invention, preferably, the step of forming the interlayer includes a step of forming a coating film of an ultraviolet ray curing liquid resin composition on the transfer substrate, a step of adhering the resin film on the first optical recording layer, a step of adhering the resin film and the coating film, a step of obtaining the interlayer by curing the resin film and the coating film in a state of being adhered to each other, and a step of releasing the transfer substrate from the interlayer.

In the method of producing an optical recording medium of the above present invention, preferably, one made by an injection molded plastic material having a larger outer circumference diameter than that of the medium substrate is used as the transfer substrate.

In the method of producing an optical recording medium of the above present invention, preferably, one made by a plastic material having a thickness of 0.5 mm or less is used as the transfer substrate.

In the method of producing an optical recording medium of the above present invention, preferably, one made by a plastic material wherein the outer circumference diameter is taper shaped and thinner than the center portion is used as the transfer substrate.

In the method of producing an optical recording medium of the above present invention, preferably, adhesion with pressure is performed from the transfer substrate side by an elastic body in the step of transferring by using the transfer substrate.

In the method of producing an optical recording medium of the above present invention, at least one layer of ultraviolet curing resin film made to be a film is used as an interlayer provided between the first and second optical recording layers, and an uneven shape corresponding to a recording pit or an uneven shape to be a guide groove is transferred to the surface of the interlayer.

The resin film made to be a film in advance has small film thickness irregularity, and by using this as a part or all of the interlayer, the film thickness irregularity of the interlayer can be suppressed.

Also, by using a resin film made to be a film in advance, the influence of warps of the transfer substrate and arising of problems caused by dusts and burrs, etc. can be also suppressed.

BEST MODE FOR CARRYING OUT THE INVENTION

Below, preferred embodiments of the present invention will be explained in detail with reference to the drawings.

The present embodiment relates to an optical recording medium (optical disk) and the production method thereof.

First Embodiment

Figure 1A:
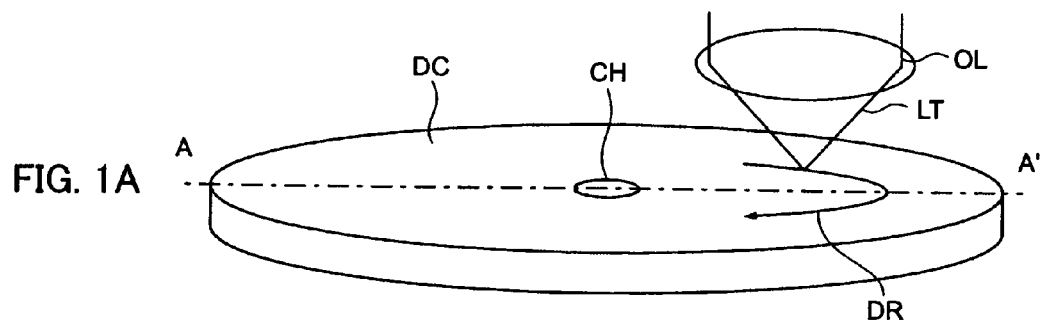
FIG. 1A is a schematic perspective view showing a state of irradiating a light on an optical disk according to a first embodiment of the present invention.

FIG. 1A is a schematic perspective view showing a state of irradiating a light on an optical disk provided with two optical recording layers according to the present embodiment.

The optical disk DC has an approximate disk shape having a center hole CH opened at the center portion and is driven to rotate in the driving direction DR.

When recording or reproducing information, the optical recording layers in the optical disk DC is irradiated with a light LT, such as a laser light in a blue to blue-violet range, by an objective lens OL, for example, having the numerical aperture of 0.8 or more.

Figure 1B:
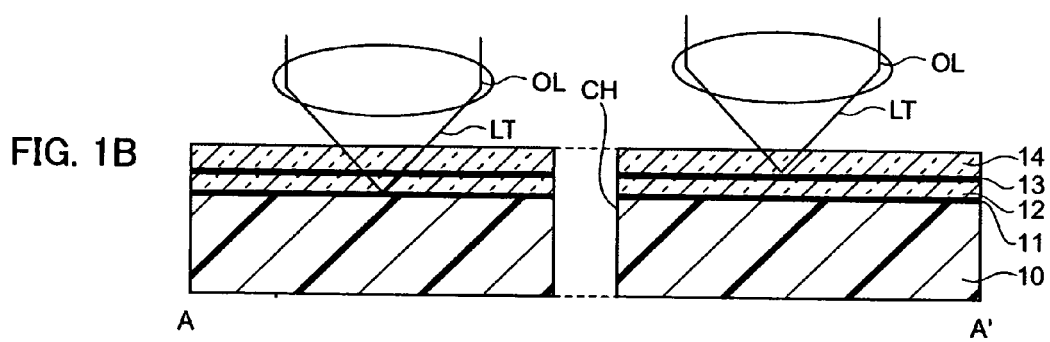
FIG. 1B is a schematic sectional view and FIG. 1C is an enlarged sectional view of a key part of the schematic sectional view in FIG. 1B.
Figure 1C:
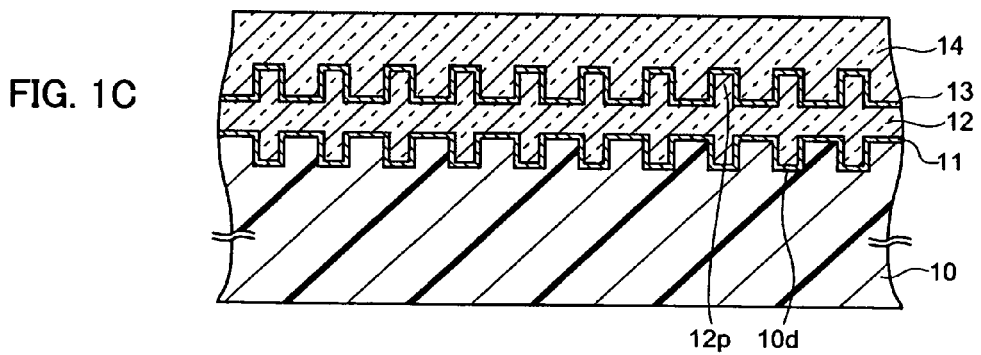

FIG. 1B is a schematic sectional view and FIG. 1C is an enlarged sectional view of a key part of the schematic sectional view in FIG. 1B.

On one surface of a disk substrate 10 made by a polycarbonate resin, etc. having a thickness of 0.3 mm or more (for example, 1.1 mm) is formed a concave portion 10d. A first optical recording layer 11 is formed along a unevenness including the concave portion 10d. An interlayer 12 is formed thereon, and a convex portion 12p is provided on the surface of the interlayer 12. A second optical recording layer 13 is formed on the interlayer 12 along the unevenness including the convex portion 12p. A light transmitting protective layer 14, for example, having a film thickness of 0.1 mm is formed thereon.

The first optical recording layer 11 and the second optical recording layer 13 have the configuration of stacking, for example, a dielectric film, a recording film of a phase change type recording material, etc., a dielectric film and a reflection film, etc. from the upper layer side in this order, wherein the configuration and the number of the layers differ in accordance with a kind and design of the recording material.

In the case of an optical disk having three or more layers, the configuration of the interlayer and the optical recording layer will be repeated.

In the optical disk as above, the first optical recording layer 11 and the second optical recording layer 13 have uneven shapes formed by the concave portion 10d formed on the surface of the disk substrate 10 and the convex portion 12p formed on the surface of the interlayer 12 and are sectionalized to track regions called lands and grooves by the uneven shapes including the concave portion 10d and the convex portion 12p.

Also, by configuring the optical recording film by a reflection film, such as an aluminum film, by using the uneven shapes formed by the concave portion 10d on the disk substrate 10 and the convex portion 12p on the interlayer 12 as a pit having a length corresponding to recording data, a read-only memory (ROM) type optical disk can be obtained.

When recording or reproducing the above optical disk, a light LT, such as a laser light, is irradiated from the protective film 14 side so as to focus on either of the first optical recording layer 11 and the second optical recording layer 13 by adjusting a distance of the objective lens OL from the optical disk. When reproducing, a returned light reflected on either of the first and second optical recording layers (11, 13) is received by a flight receiving element and a reproducing signal is taken out.

As explained above, the respective two or more optical recording layers are separated by the interlayer in the vertical direction, so that one of a plurality of the optical recording layers can be selectively recorded or reproduced by changing the focal position.

In a system of an optical disk having a laser wavelength of 405 nm and the NA of 0.85, it is possible to separate between the optical recording layers by making the thickness of the interlayer 10 μm or more.

Note that when using such a large NA, spherical aberration due to film thickness irregularity becomes a problem. The film thickness irregularity is a total of all light transmittance layers and interlayer, so that film thickness irregularity of each interlayer is required to be as small as possible.

For example, in a system wherein the laser-wavelength λ is 405 nm and the NA is 0.85, the thickness irregularity is required to be $|\Delta t| < 5.26 \lambda / NA^4$, so that the thickness irregularity is required to be ±4 μm. Assuming that film thickness irregularity arises to the same extent in the light transmitting layer and interlayer, a multilayer disk having up to three layers can be configured by suppressing the film thickness irregularity of the interlayer to ±1 μm.

The optical disk of the present embodiment is configured that at least one ultraviolet curing resin film made to be a film in advance is included in the interlayer for improving uniformity of the film thickness of the interlayer 12, and an uneven shape for the second optical recording layer is formed on the surface of the interlayer.

The resin film made to be a film in advance has small film thickness irregularity, so that the film thickness irregularity of the interlayer can be suppressed by using it as a part or all of the interlayer.

Also, by using the resin film made to be a film in advance, the influence of warps of a transfer substrate and arising of a problem of dusts and burrs can be also suppressed.

Figure 2:
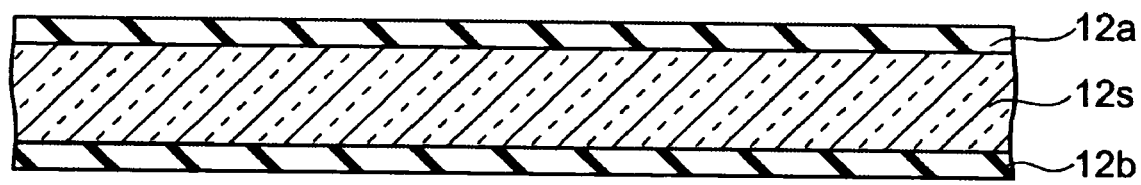
FIG. 2 is a sectional view showing the configuration of an ultraviolet curing resin film.

FIG. 2 is a sectional view showing the configuration of the above ultraviolet curing resin film.

Release films (12a and 12b) are respectively adhered to the upper and lower surfaces of the ultraviolet curing resin film 12s made to be a film in advance and released when used.

As to the release films (12a and 12b) on the upper surface and the lower surface, a force required to release may be differentiated, for example, the release film 12a on the upper surface may be a heavy releasability side and the release film 12b on the lower surface may be the light releasability side. By differentiating the releasability, it becomes possible to always release from the light releasability side.

Since the ultraviolet curing resin film made to be a film in advance as above has a high viscosity in the resin and does not flow, there is an advantage that processing of stamping out to be a disk shape in advance, etc. becomes possible.

Figure 3:
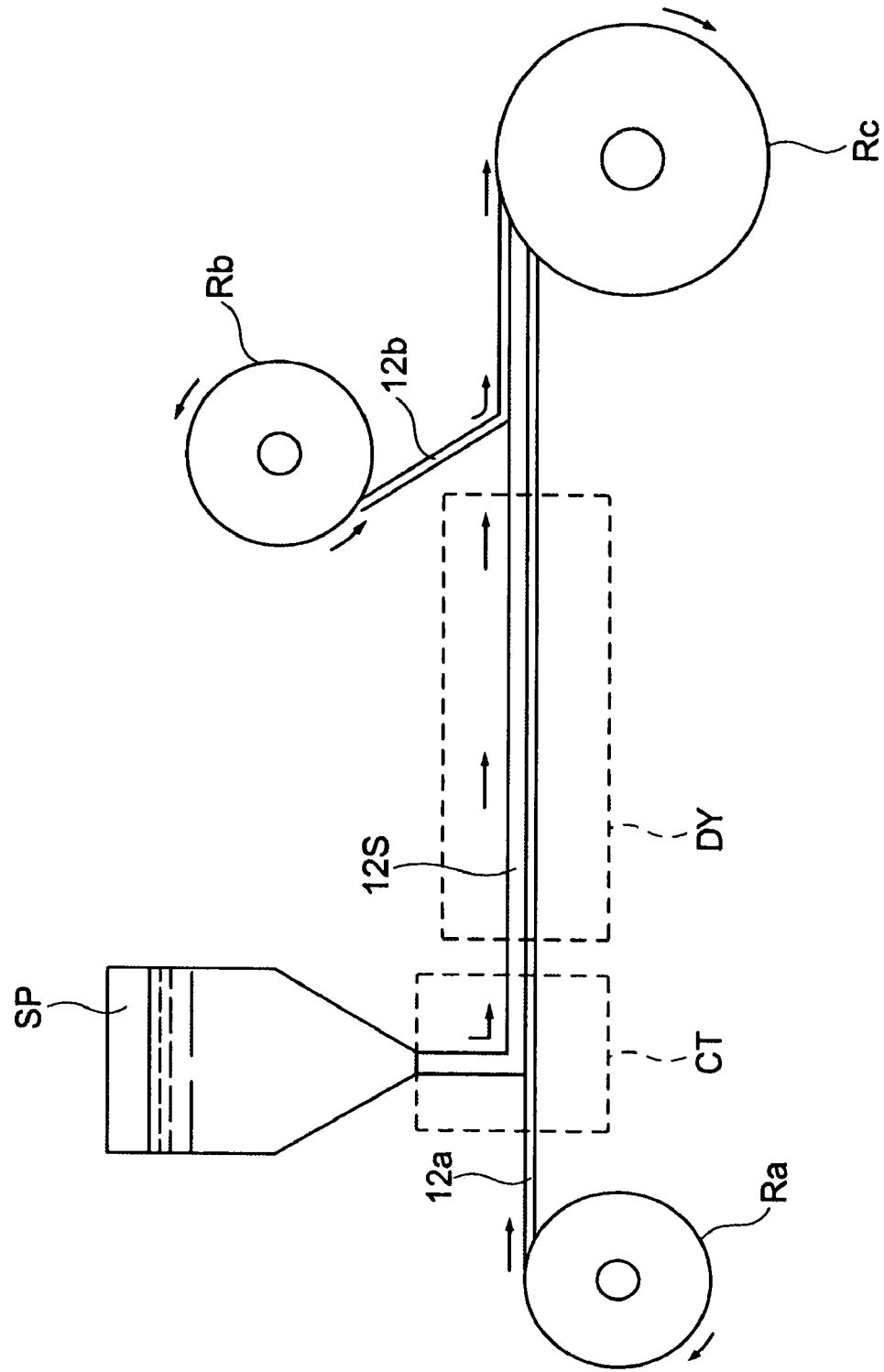
FIG. 3 is a schematic view showing the configuration of a device for producing an ultraviolet curing resin film.

FIG. 3 is a schematic view showing the configuration of a device for producing the above ultraviolet curing resin film.

An ultraviolet curing resin is in a molten state in a resin supplying portion SP and mixed to be homogenized. A resin is supplied from the resin supplying portion SP to be applied to the release film 12a fed from a feeding roll Ra in a coating portion CT by a roll coater, knife coater, gravure coater, dye coater and reverse coater, etc., and a solvent is evaporated for those containing solvent in a drying portion DY and those not containing solvent is left as it is to be made to be a resin film 12s by cooling, etc.

The other release film 12b having differentiated releasability fed from the feeding roll Rb is adhered on the upper surface of the resin film 12s and wound by a winding roll Rc.

As explained above, the resin film 12s sandwiched by the release films (12a and 12b) configured as shown in FIG. 2 can be obtained.

As the ultraviolet curing resin, those blended with a photopolymerization monomer, a photopolymerization starting agent and an additive, or a bind polymer can be used.

Also, an ultraviolet curing adhesive may be also used, for example, those composed of a homopolymer and/or a copolymer, such as acrylic acid of an acrylic resin, methyl acrylate, ethyl acrylate, propyl acrylate, butyl acrylate, 2-ethylhexyl acrylate, methacrylic acid, methyl methacrylate, ethyl methacrylate, butyl methacrylate and 2-hydroxyethyl acrylate, blended with an ultraviolet curing resin and a photopolymerization initiator, or those obtained by mixing a polymer and a copolymer of an adhesive, wherein a photo-curing type polymerizing group is provided to the side chain, with a photopolymerization initiator, etc. may be used. The adhesive is not limited to acrylics and rubbers, silicones, polyvinyl ethers, etc. may be also used.

Also, an adhesion-providing agent or a filler, softener, wax, antioxidant, cross-linking agent may be blended in accordance with need.

As the release film, a support sheet wherein at least one surface has releasability is sufficient, and the releasability may be given by using a release treatment agent.

As a support sheet material, it is preferable to use a plastic film having excellent surface smoothness, and plastic films of a polyethylene resin, a polypropylene resin and other polyolefin resins, a polyethylene terephthalate resin, a polybutylene terephthalate resin and other polyester resins, an acetate resin, a polystyrene resin, a vinyl chloride resin may be mentioned. As the release treatment agent, a silicone resin, an alkyd resin, a fluorocarbon resin, a cellulose resin, a melamine resin, an acrylic resin, polyurethane resin and a polyester resin, etc. may be mentioned.

Next, a method of producing a multilayer optical disk according to the present embodiment will be explained with reference to the drawings.

First, a disk substrate stamper 20 having on its surface an uneven pattern including a convex portion 20p as an inverse pattern for transferring to a disk substrate is prepared by a conventionally known certain method.

Figure 4A:
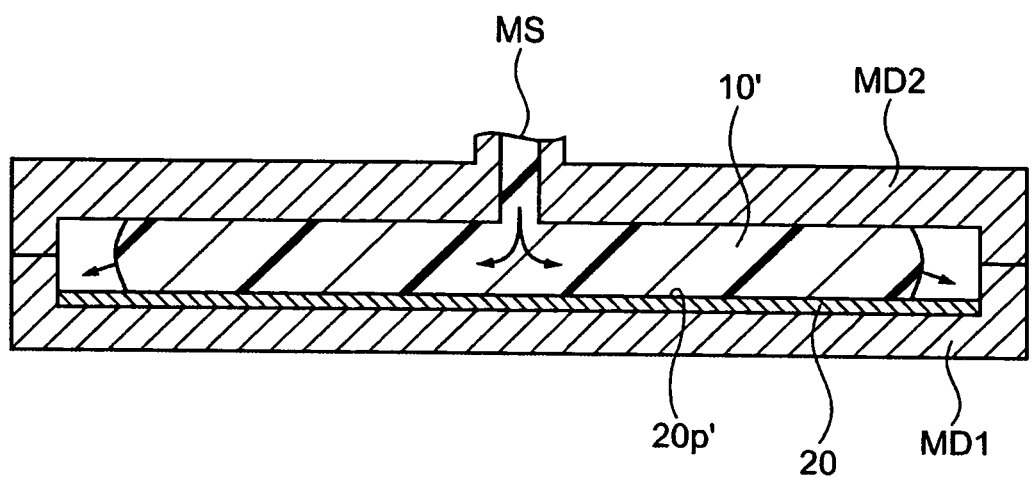
FIG. 4A is a schematic view and FIG. 4B is a sectional view showing production processes of a method of producing the optical disk according to the first embodiment.

Next, as shown in FIG. 4A, the above disk substrate stamper 20 is arranged and fixed inside a cavity composed of molds (MD1 and MD2), so that a convex portion formed surface 20p' of the disk substrate stamper 20 faces to inside of the cavity, consequently, an injection molding mold is configured.

Figure 4B:
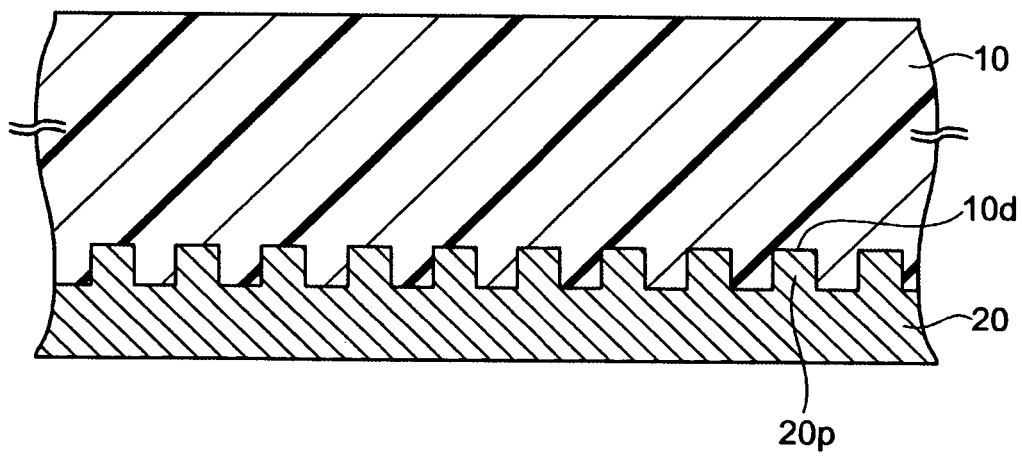

By injecting a resin 10', for example, a molten polycarbonate resin, to inside the cavity of the above injection molding mold from an inlet MS of the mold, a disk substrate 10 is formed on the disk substrate stamper 20 as shown in FIG. 4B.

Here, on the surface of the disk substrate 10 is formed a concave portion (groove) 10d at a position corresponding to the convex portion 20p of the disk substrate stamper 20.

Figure 5A:
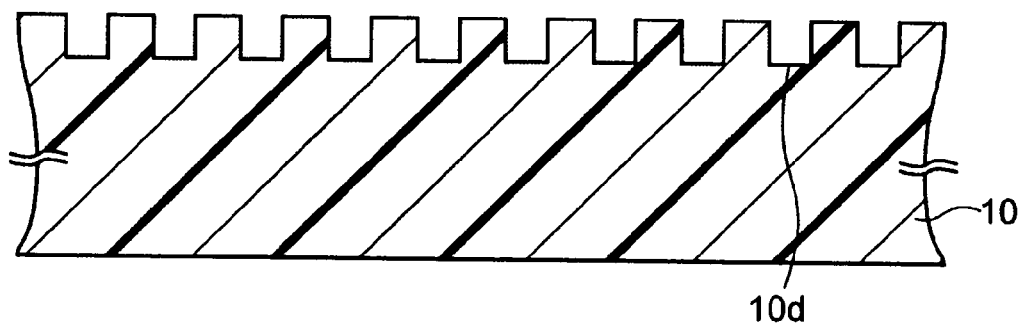
FIG. 5A and FIG. 5B are sectional views showing processes continued from FIG. 4B.

By releasing from the above injection molding mold, a disk substrate 10 having an uneven pattern including the concave portion 10d to be a groove pattern or a pit pattern on its surface as shown in FIG. 5A is obtained.

Figure 5B:
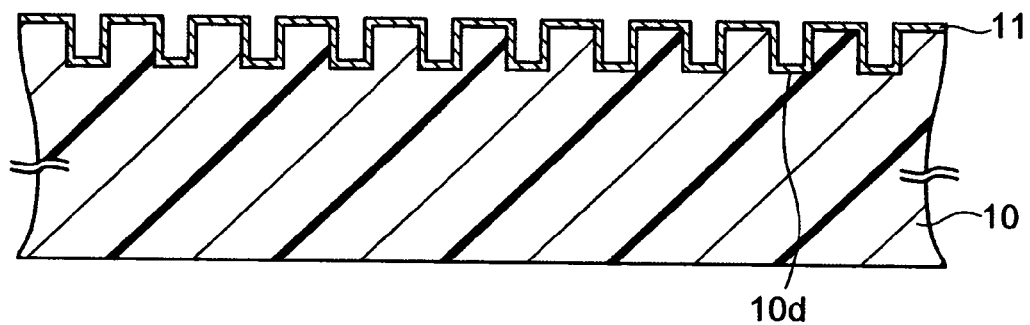

Next, as shown in FIG. 5B, after removing dusts by blowing a gas, such as an air or a nitrogen gas, to the surface of the disk substrate 10, the first optical recording film 11 having a stacked structure of a reflection film, a dielectric film, a recording film and a dielectric film is formed in this film formation order, for example, by a sputtering method, a vacuum evaporation method, spin-coat method, etc.

As the above recording film, for example, a recording film including a phase change type optical recording film, a magneto-optical recording film or an organic dye may be used.

Alternately, in the case of a ROM type optical disk, the optical recording film is formed by a reflection film of an aluminum film, etc.

When forming a film of a phase change type recording material as the above recording film, the phase change type recording material is crystallized by irradiating a YAG laser light or other infrared ray. This corresponds to an initialization process of the first optical recording layer 11.

Figure 6A:
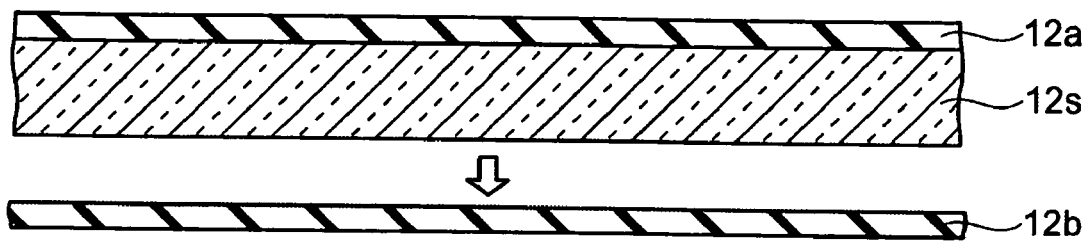
FIG. 6A and FIG. 6B are sectional views showing processes continued from FIG. 5B.

Next, as shown in FIG. 6A, the release film 12b on the light releasability side of the resin film 12s sandwiched by the release films (12a and 12b) shown in FIG. 2 is released.

Figure 6B:
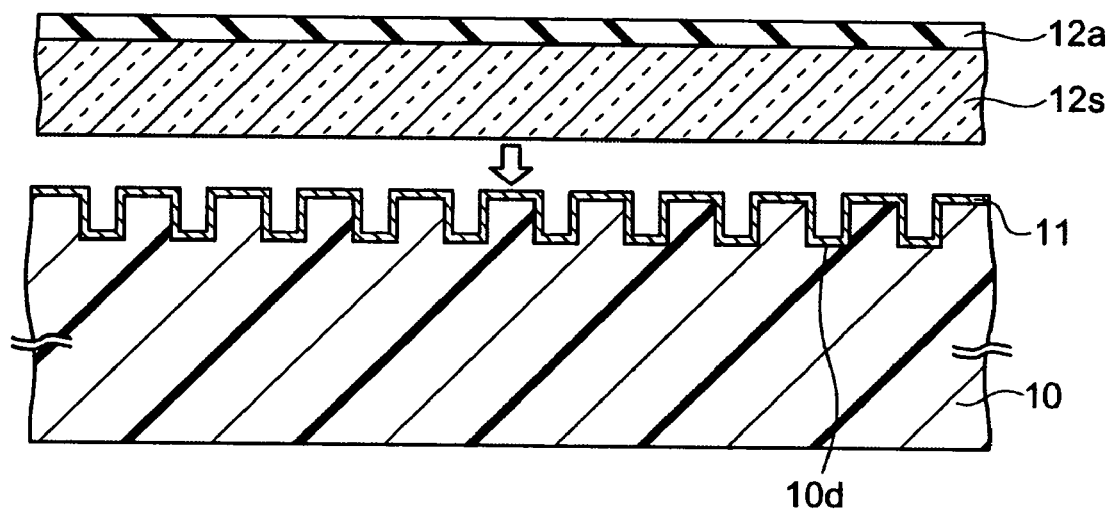

Next, as shown in FIG. 6B, the resin film 12s is adhered to an upper surface of the first optical recording layer 11 by using a pad or a roller, etc.

Figure 7A:
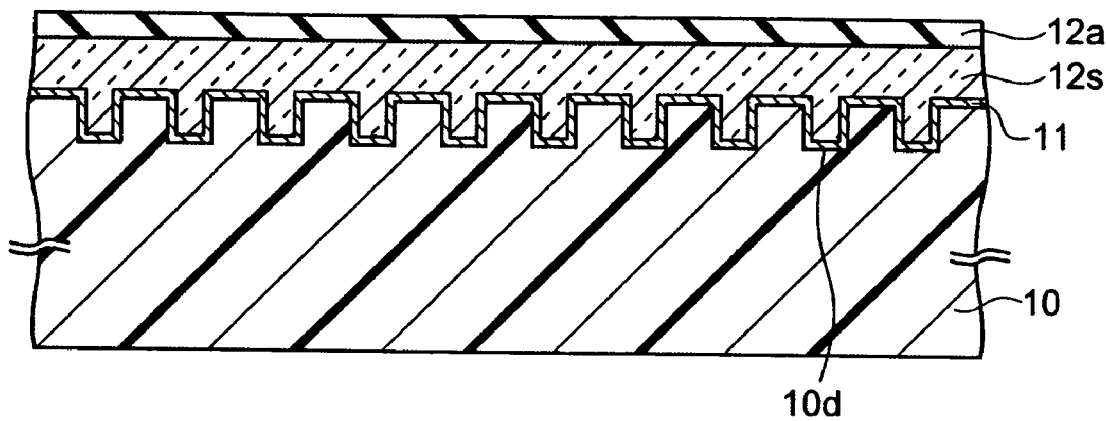
FIG. 7A and FIG. 7B are sectional views showing processes continued from FIG. 6B.
Figure 7B:
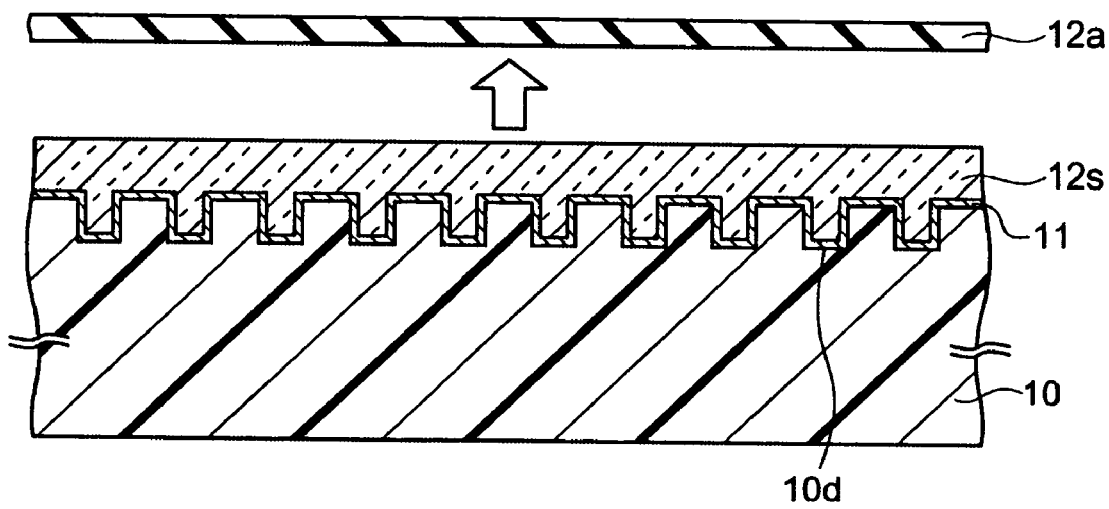

After adhering with sufficient strength to obtain the state shown in FIG. 7A, the release film 12a on the heavy releasability side of the resin film 12s is released as shown in FIG. 7B.

Figure 8A:
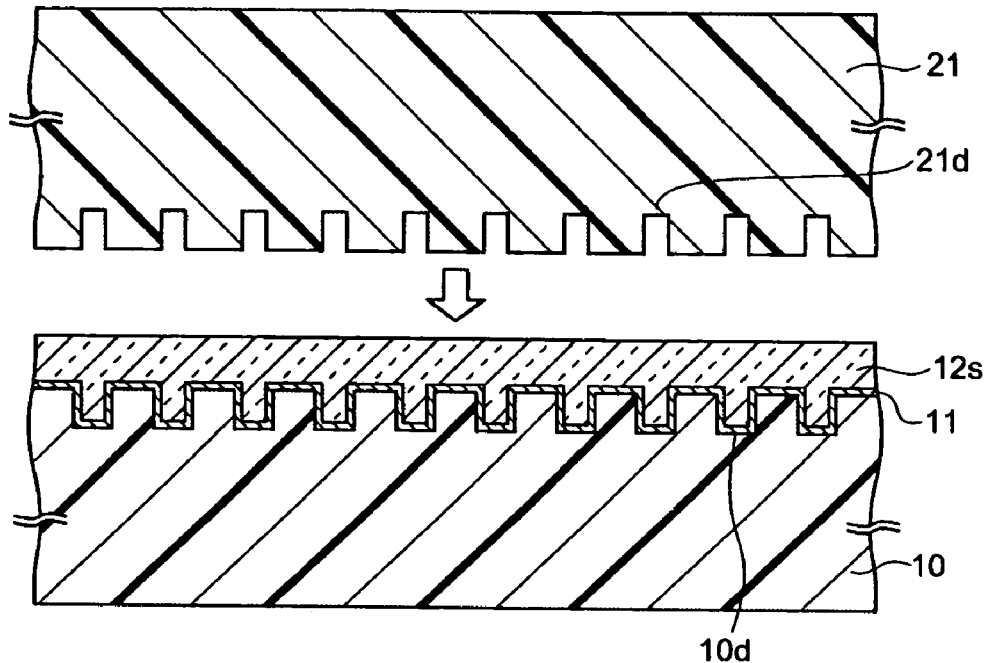
FIG. 8A and FIG. 8B are sectional views showing processes continued from FIG. 7B.

Next, as shown in FIG. 8A, a transfer substrate 21, such as a resin stamper, having an uneven pattern including the concave portion 21d for the second optical recording layer formed in a separate process in advance is adhered to the resin film 12s by using a pad or a roller, etc.

Figure 8B:
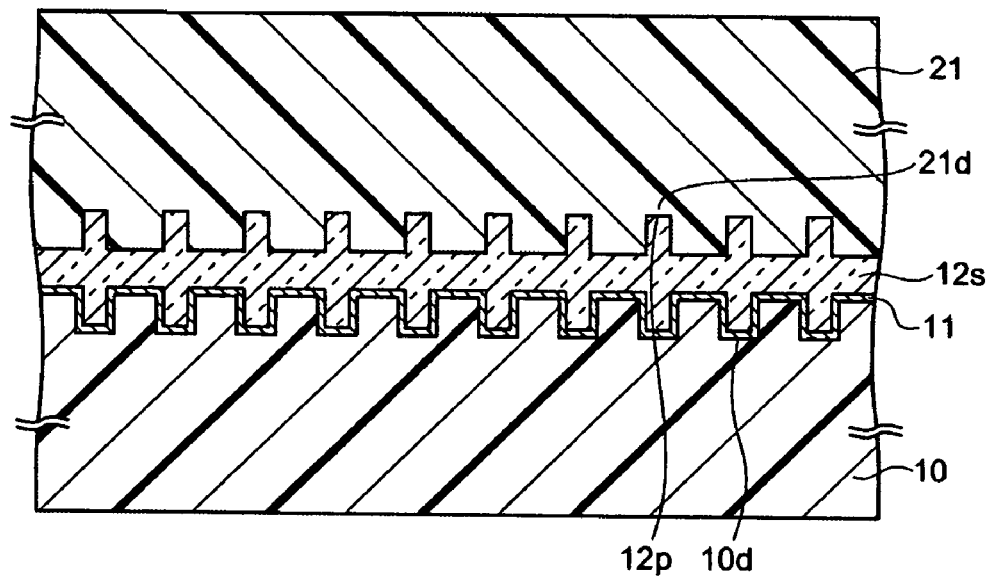

By adhering the transfer substrate 21 with a sufficient strength, as shown in FIG. 8B, a convex portion 12p is transferred at a position corresponding to the concave portion 21d of the transfer substrate 21 on the surface of the release film 12a.

Figure 9A:
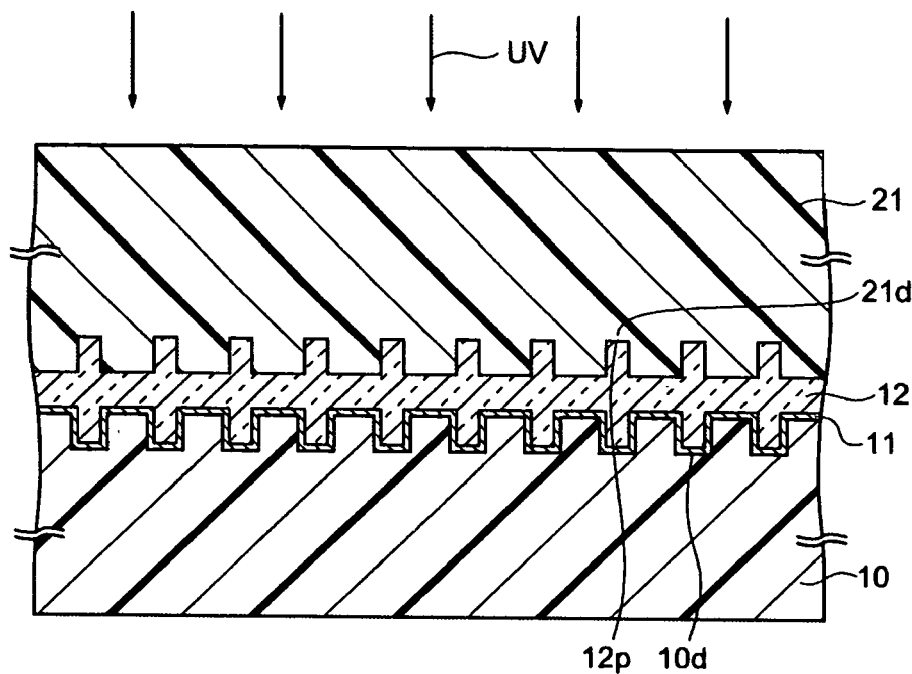
FIG. 9A and FIG. 9B are sectional views showing processes continued from FIG. 8B.

Next, as shown in FIG. 9A, the resin film 12s is cured, for example, by irradiating an ultraviolet ray LW from the transfer substrate 21 side to obtain an interlayer 12 having an uneven shape for the second optical recording layer transferred on its surface. During the curing, adhesiveness between the surface of the interlayer 12 and the transfer substrate 21 declines.

Figure 9B:
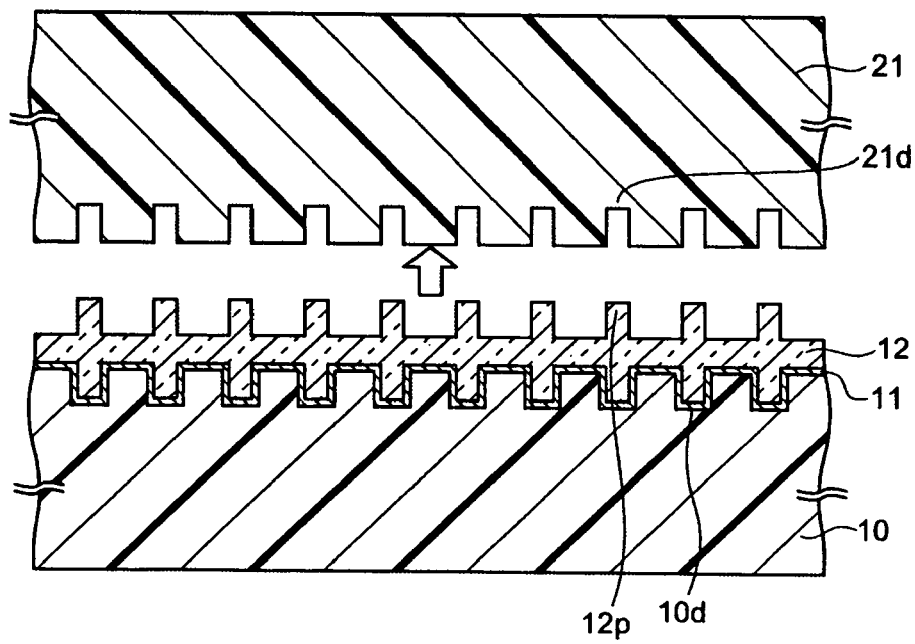

Next, as shown in FIG. 9B, the surface of the interlayer 12 and the transfer substrate 21 are separated on the boundary surface.

Figure 10A:
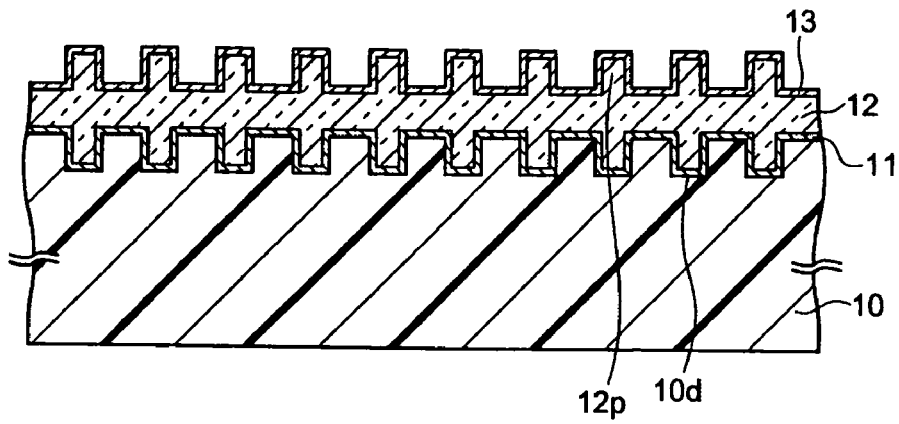
FIG. 10A and FIG. 10B are sectional views showing processes continued from FIG. 9B.
Figure 10B:
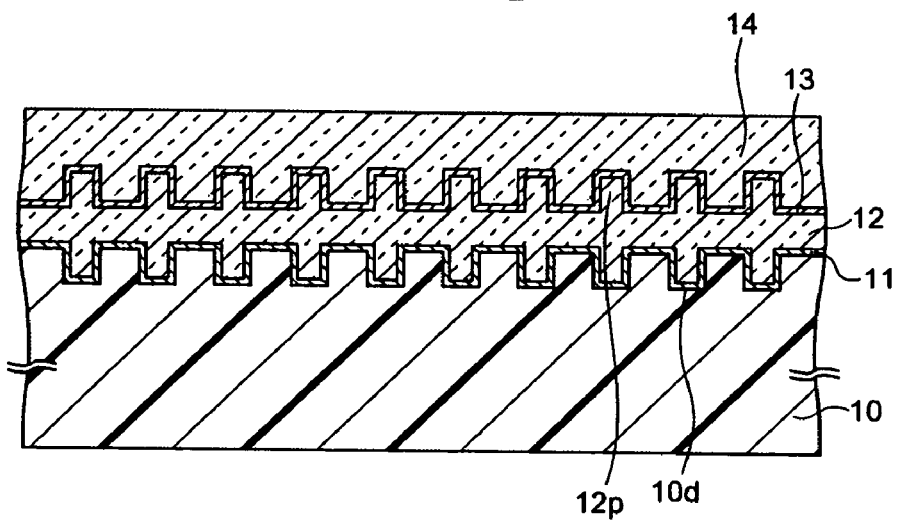

Next, as shown in FIG. 10A, after removing dusts by blowing a gas, such as an air or a nitrogen gas, to the surface of the interlayer 12, the second optical recording film 13 having a stacked structure of a translucent reflection film, a dielectric film, a recording film and a dielectric film is formed in this film formation order, for example, by a sputtering method, a vacuum evaporation method, spin-coat method, etc.

As the above recording film, for example, a recording film including a phase change type optical recording film, a magneto-optical recording film or an organic dye may be used.

Alternately, in the case of a ROM type optical disk, the optical recording film is formed by a translucent reflection film of an aluminum film, etc.

Next, a light transmittance protective layer 14 is formed on the second optical recording film 13. The protective layer 14 may be formed, for example, by a method of adhering a protective layer sheet with an adhesive.

When forming a film of a phase change type recording material as the above recording film, the phase change type recording material is crystallized by irradiating a YAG laser light or other infrared ray. This corresponds to an initialization process of the second optical recording layer 13.

From the above, an optical disk having a plurality of optical recording layers shown in FIG. 1 can be produced.

In the above production method, the ultraviolet curing resin film is adhered to the disk substrate 10 (the first optical recording layer 11) side first, but it may be adhered to the transfer substrate 21 side first before bonding with pressure with the disk substrate 10 (the first optical recording layer 11).

As the disk substrate 10, an injection molded substrate using a polycarbonate resin, a PMMA resin, an amorphous polyolefin resin, a modified acrylic resin and other resins and a glass 2P substrate, etc. can be used.

As explained above, when curing from the transfer substrate 21 side, the disk substrate 10 does not always required to have light transmittance as far as being provided with an uneven pattern for the first optical recording layer.

As the transfer substrate 21, a Ni stamper may be used, but when using a plastic substrate, irradiation of an ultraviolet ray from the transfer substrate 21 side becomes possible as explained above and it becomes unnecessary to let an ultraviolet ray pass through to the first optical recording layer 11 or to the disk substrate 10. Note that it is necessary to have a property of being able to be released on the boundary of the transfer substrate 21 and the interlayer 12 after the curing.

As a method of obtaining releasability after curing, other then a method of using a material having low adhesiveness with an ultraviolet curing film, such as a cyclic polyolefin resin, a method of declining adhesiveness of the ultraviolet curing resin film is possible.

Specifically, the adhesiveness can be declined by increasing molecular weight and heightening hardness.

Note that when the adhesiveness with the disk substrate 10 is lost, it can be handled by using at least two kinds of interlayer materials, using an ultraviolet curing resin film for adhesion at the lowermost portion, and using an ultraviolet curing resin film having good releasability from the transfer substrate at the uppermost portion.

An adhesive force between ultraviolet curing resin films can be obtained by adhering the ultraviolet curing resin films together in an uncured state or in a state only one of them is cured. In this case, not only the above cyclic polyolefin resin but a general polycarbonate resin, a PMMA resin, a chain polyolefin resin and a modified acrylic resin, etc. can be used.

Figure 11:
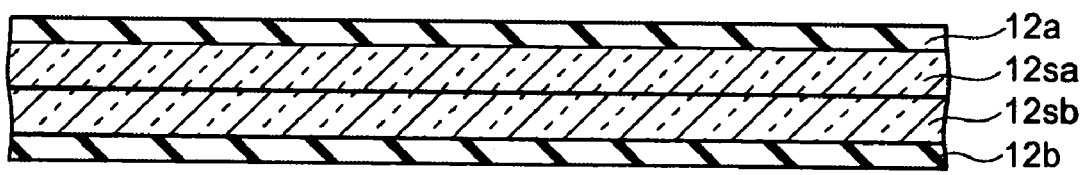
FIG. 11 is a sectional view showing the configuration of an ultraviolet curing multilayer resin film wherein two kinds of materials are stacked.

FIG. 11 is a sectional view showing the configuration of an ultraviolet curing multilayer resin film made by stacking two kinds of materials.

An ultraviolet curing resin film 12sa made to be a film in advance and a resin film 12sb are stacked, a release film 12a is adhered to the resin film 12sa and the release film 12b is adhered to the resin film 12sb, which are released when used.

The multilayer resin film in this case can be formed in the same way as the resin film in FIG. 2 by using the device shown in FIG. 3.

Figure 12:
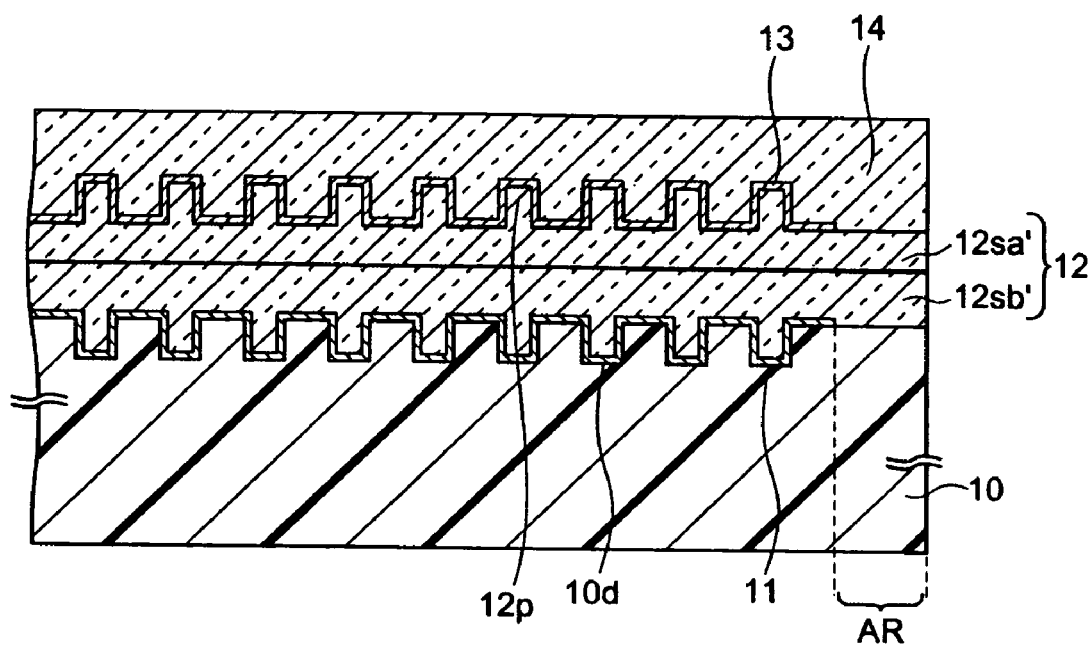
FIG. 12 is a sectional view of an optical disk wherein an interlayer is configured by using a multilayer resin film, particularly showing edges of an outer circumference and inner circumference are shown.

FIG. 12 is a sectional view of an optical disk having a plurality of optical recording layers, wherein the interlayer is configured by using the above multilayer resin film, particularly showing edge portions of an outer circumference and inner circumference.

The interlayer 12 is a stacked structure of a resin film cured portion 12sa' and a resin film cured portion 12sb', wherein the first and second optical recording layers (11 and 13) are not provided at edge portions of the outer circumference and inner circumference and the interlayer 12 is configured to directly contact the disk substrate 11 and the protective layer 14.

By selecting two materials for composing the interlayer, the interlayer 12 can secure adhesiveness with the disk substrate 11 and the protective layer 14.

In processes of producing an optical disk having a plurality of optical recording layers as above wherein the interlayer is made by using the above multilayer resin film, when adhering the multilayer resin film first to the disk substrate, the release sheet on the light releasability side is made to be on the side of the ultraviolet curing resin film adhered to the disk substrate.

Also, when adhering the multilayer resin film to the transfer substrate first, the release sheet on the light releasability side is made to be on the side of the ultraviolet curing resin film having low adhesiveness.

Of course, two or more kinds of ultraviolet curing films may be adhered successively. In this case, they may be adhered either of the disk substrate side or the transfer substrate side, or separately adhered to the both sides and the two may be finally bonded with pressure.

Advantages obtained by making it multilayer is that hardness, shrinking percentage, transferability, film forming properties and corrosion behavior can be changed in addition to the above adhesiveness and releasability.

For example, when hardness is heightened, transferability and deformation at film formation generally become preferable but adhesiveness declines and shrinking percentage tends to increase. When the shrinking percentage becomes large, there arises a disadvantage of arising warps on the disk. When it is difficult to satisfy all properties with one kind of film, for example, by using those having high hardness and good film formation properties as an ultraviolet curing resin film of the upper portion requiring transferability and those having a small shrinking percentage as an ultraviolet curing resin film of the lower portion, an interlayer having good transferability wherein warps of a disk is hard to arise can be configured.

Second Embodiment

Figure 13:
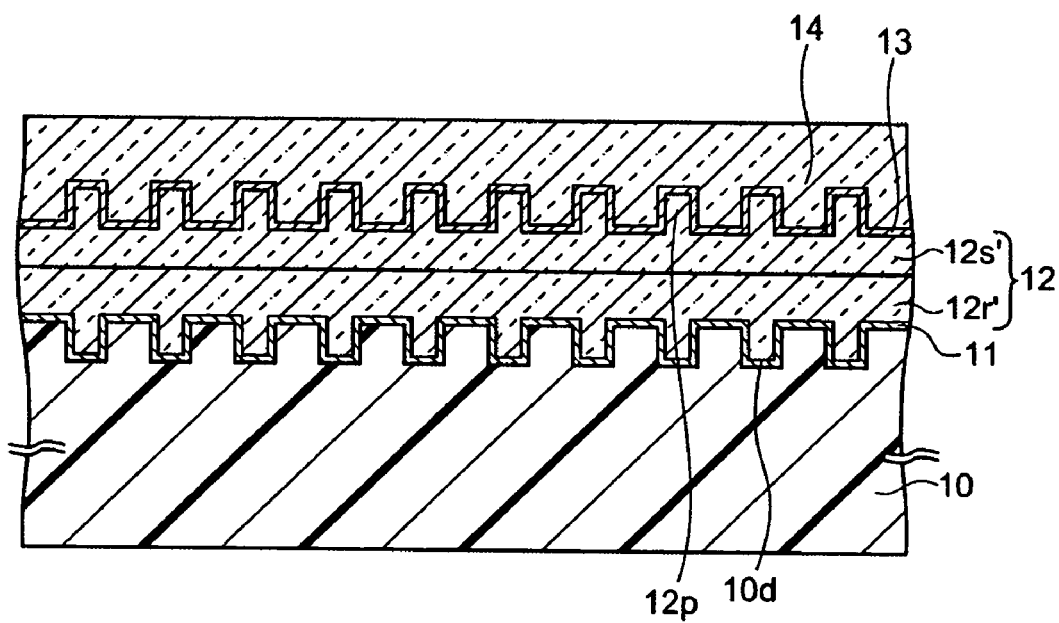
FIG. 13 is a sectional view of an optical disk according to a second embodiment of the present invention.

FIG. 13 is a sectional view of an optical disk having a plurality of optical recording layers according to the present embodiment.

It has substantially the same configuration as that of the optical disk according to the first embodiment, but has a different point that an interlayer 12 is obtained by adhering an ultraviolet curing resin film made to be a film in advance to a coating film of an ultraviolet curing liquid resin composition and curing the same.

A method of producing the above optical disk will be explained.

Figure 14A:
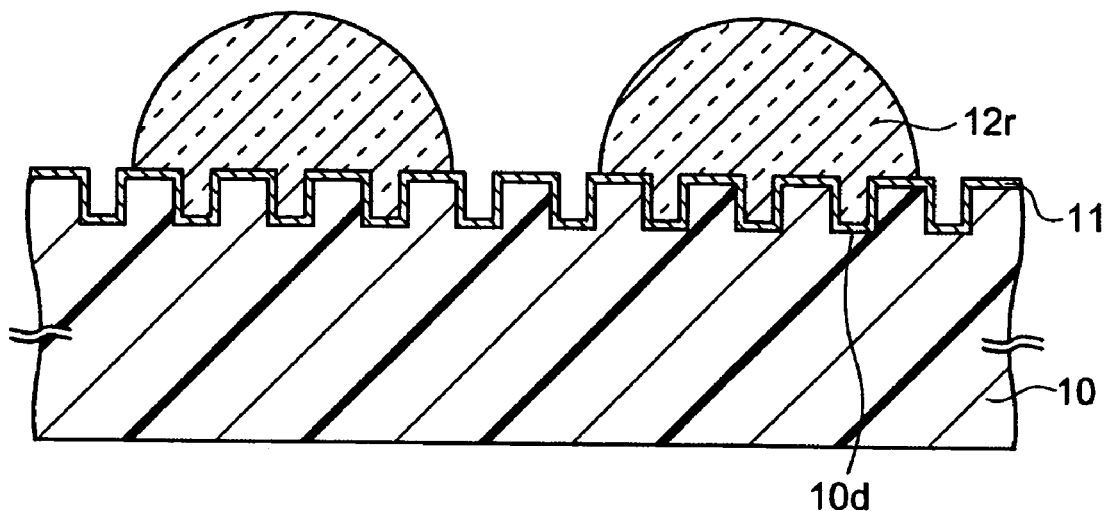
FIG. 14A and FIG. 14B are sectional views showing production processes of a method of producing the optical disk according to the second embodiment.
Figure 14B:
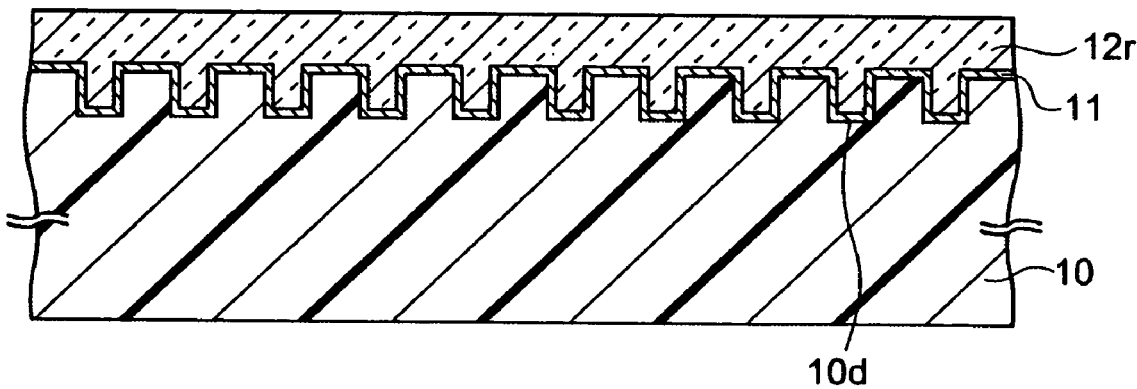

First, a disk substrate 10 is formed in the same way as in the first embodiment, a first optical recording film 11 is formed thereon, then, as shown in FIG. 14A, an ultraviolet curing liquid resin composition 12r is supplied on the first optical recording film 11, and as shown in FIG. 14B, the liquid resin composition 12r is applied to be a uniform film thickness to form a coating film by a spin-coat method of rotating the disk substrate 10.

Figure 15A:
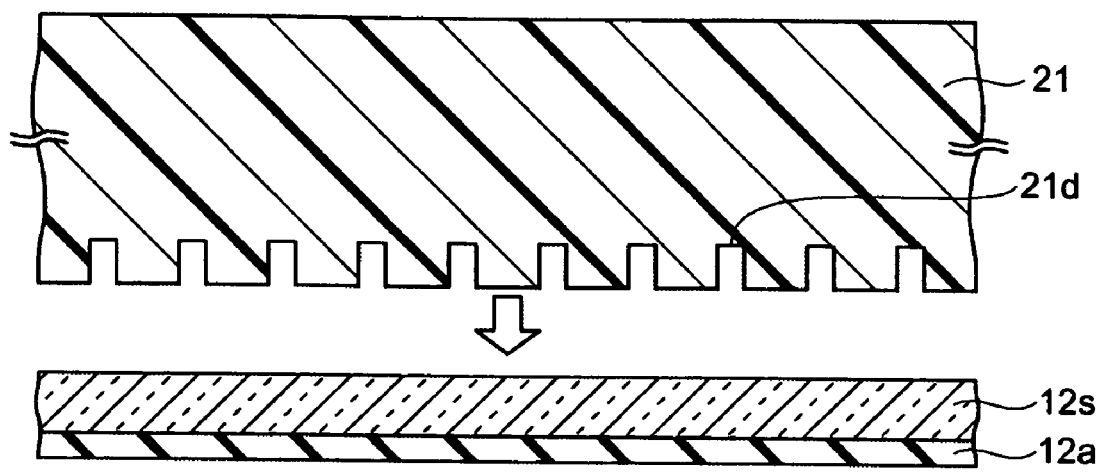
FIG. 15A and FIG. 15B are sectional views showing processes continued from FIG. 14B.

Next, as shown in FIG. 15A, the release film 12b on the light releasability side of the resin film 12s sandwiched by the release films (12a and 12b) shown in FIG. 2 is released, and a transfer substrate 21, such as a resin stamper, having an uneven pattern including the concave portion 21d for the second optical recording layer formed in a separate process in advance is adhered to the resin film 12s by using a pad or a roller, etc.

Figure 15B:
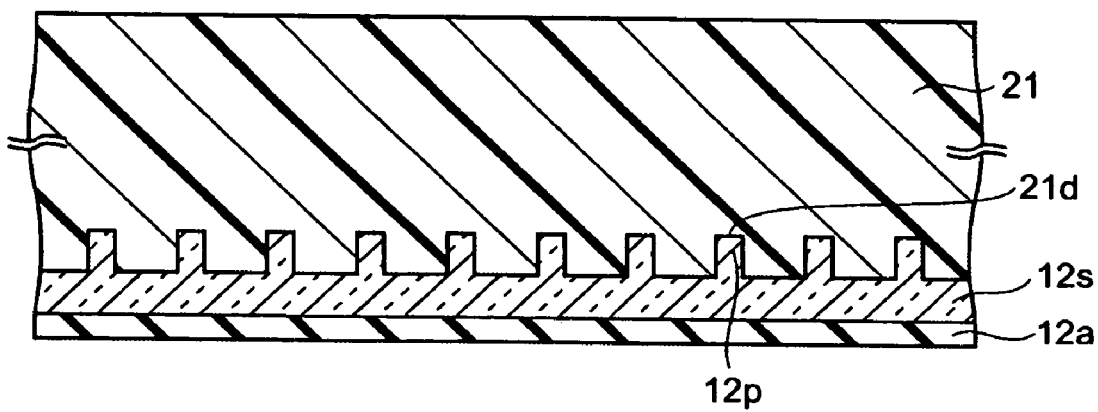

By adhering the transfer substrate 21 with sufficient strength, as shown in FIG. 15B, the convex portion 12p is transferred to a position corresponding to the concave portion 21d of the transfer substrate 21 on the surface of the release film 12a.

Figure 16A:
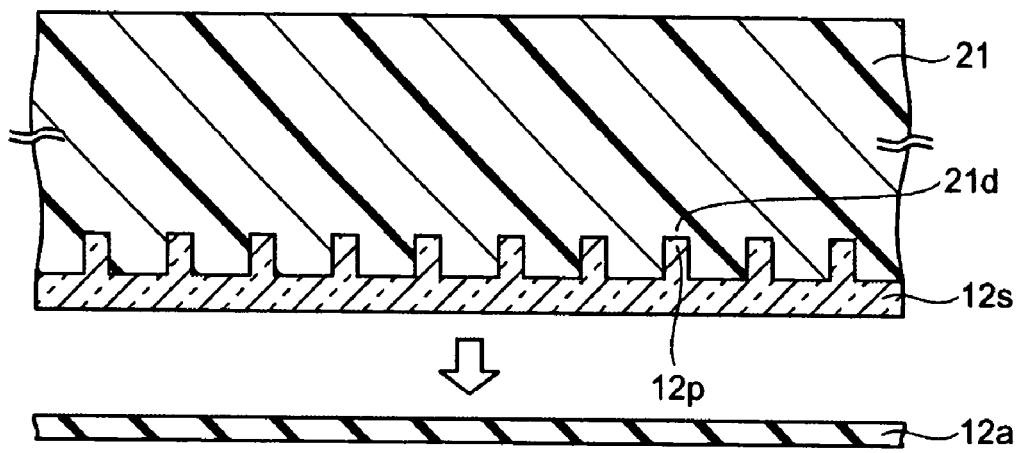
FIG. 16A and FIG. 16B are sectional views showing processes continued from FIG. 15B.

Next, as shown in FIG. 16A, the release film 12a on the heavy releasable side of the resin film 12s is released.

Figure 16B:
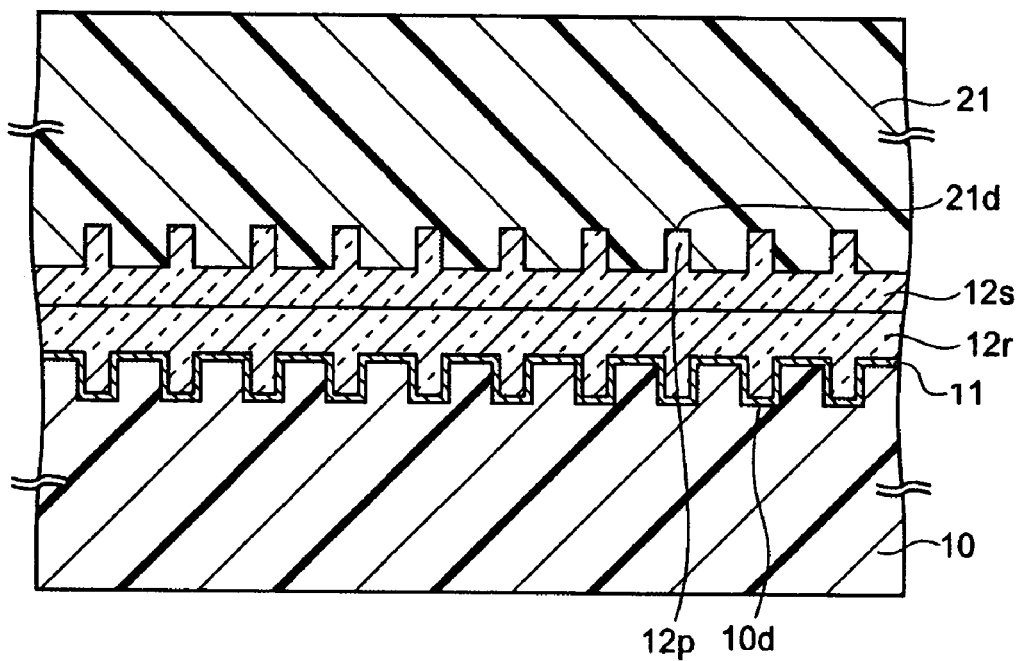

Next, as shown in FIG. 16B, the surface of the coating film of the liquid resin composition and the surface of the resin film 12s are adhered together by using a pad or a roller, etc.

Figure 17A:
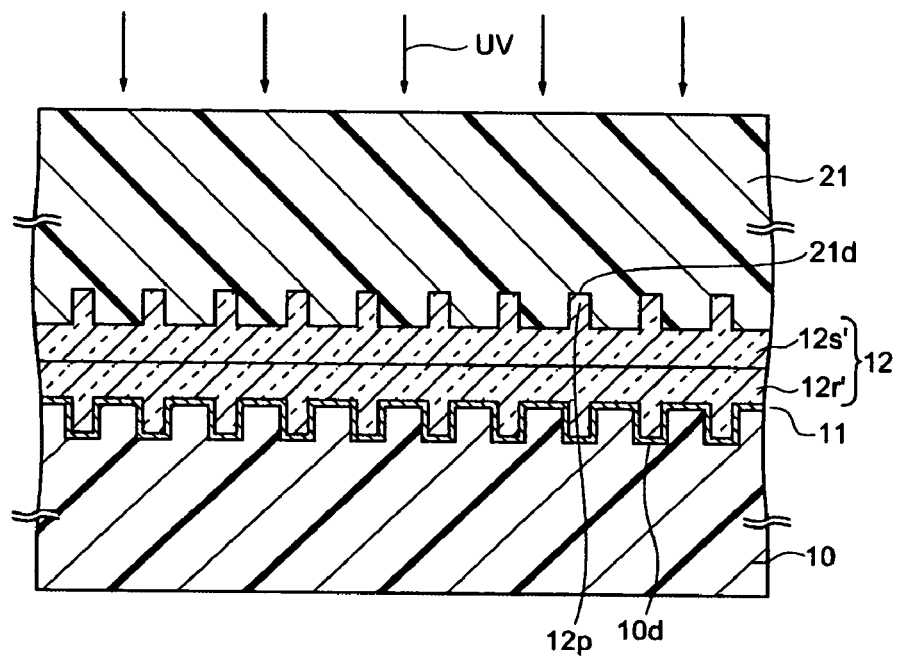
FIG. 17A and FIG. 17B are sectional views showing processes continued from FIG. 16B.

Next, as shown in FIG. 17A, the resin film 12s and the coating film of the liquid resin composition 12r are cured, for example, by irradiating an ultraviolet ray UV from the transfer substrate 21 side so as to obtain an interlayer 12 as a stacked structure of a resin film cured portion 12s' being transferred on its surface the uneven pattern for the second optical recording layer and a liquid resin composition coating film cured portion 12r'. During the curing, adhesiveness of the surface of the resin film cured portion 12s' and the transfer substrate 21 declines.

Figure 17B:
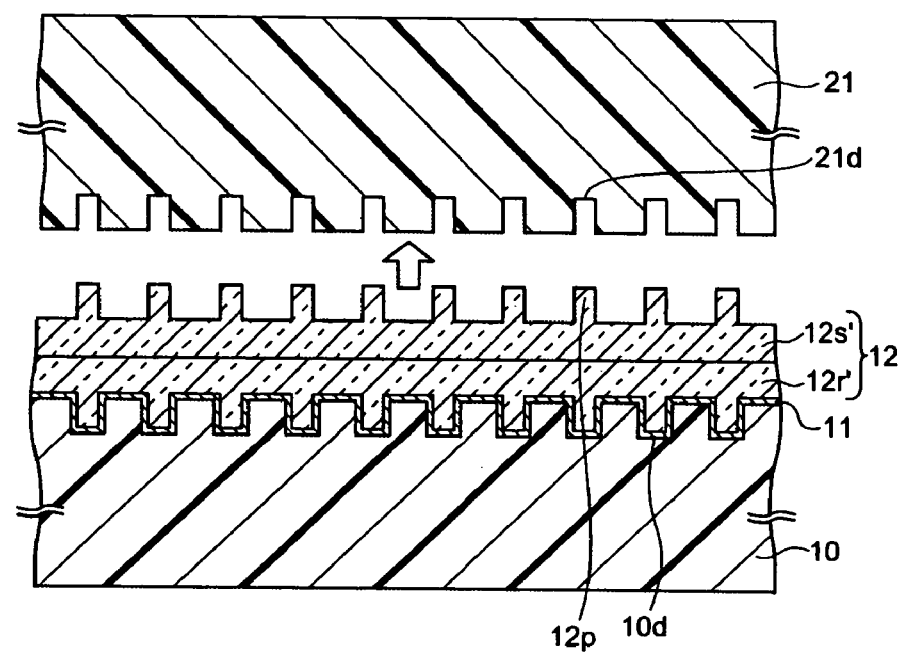

Next, as shown in FIG. 17B, the surface of the resin film cured portion 12s' composing the interlayer 12 and the transfer substrate 21 are separated on the boundary.

Figure 18A:
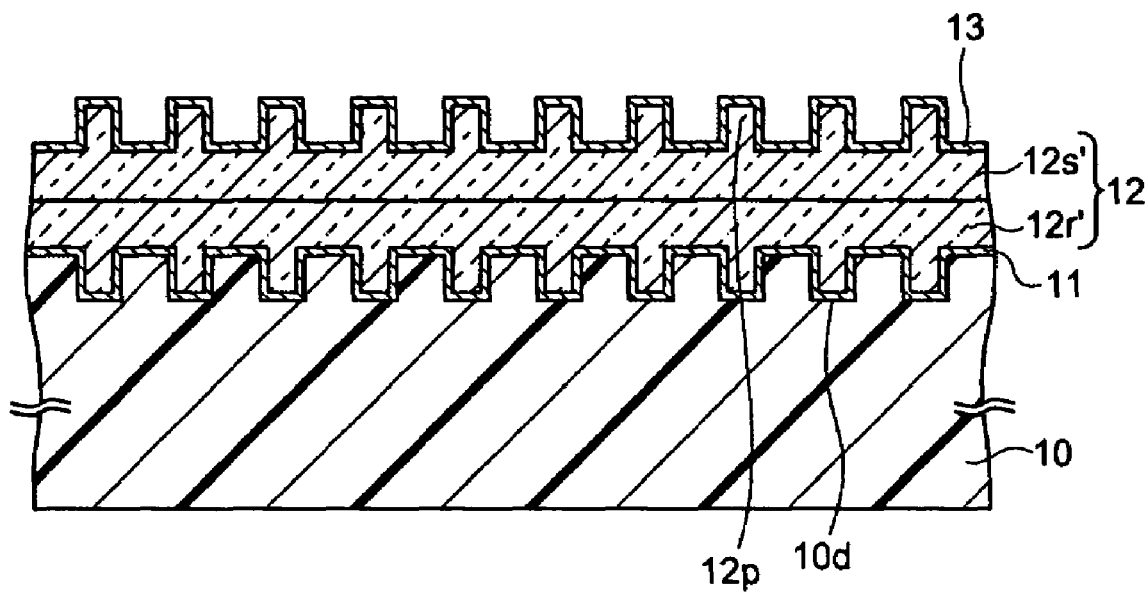
FIG. 18A and FIG. 18B are sectional views showing processes continued from FIG. 17B.

After that, in the same way as in the first embodiment, as shown in FIG. 18A, the second optical recording film 13 is formed on the resin film cured portion 12s' composing the interlayer 12, and a light transmitting protective layer 14 is formed thereon.

From the above, an optical disk having a plurality of optical recording layers shown in FIG. 13 can be produced.

When performing applying by spin-coat by using an ultraviolet curing resin on a shape having a center hole like an optical disk, film thickness irregularity arises from the inner circumference to the outer circumference of the disk, so that it is difficult to suppress the film thickness irregularity, for example, to ±1 µm or less with respect to the thickness of the interlayer of 20 µm.

In the method of producing in the present embodiment, by making a thickness of coating by spin-coat thin to five times as much as the film thickness irregularity and forming the rest of the thickness with the ultraviolet curing resin film, an interlayer having a little thickness irregularity can be formed.

For example, when forming an interlayer of 20 µm, by applying a liquid resin of an amount of 5 µm and composing the rest amount of 15 µm with an ultraviolet curing resin film, total film thickness irregularity can be suppressed to ±1 µm or less.

Figure 19:
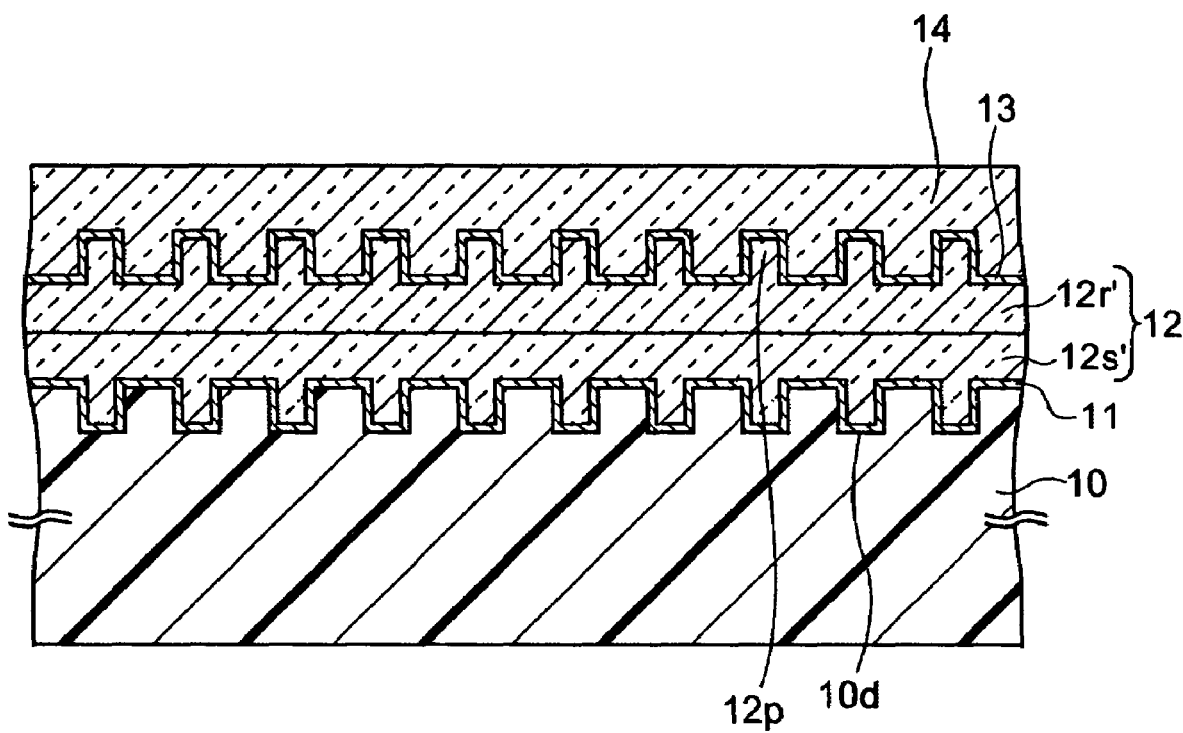
FIG. 19 is a sectional view of another configuration of the optical disk according to the second embodiment of the present invention.

Also, an optical disk according to the present embodiment may be also configured as shown in FIG. 19.

The configuration is substantially the same as that of the optical disk shown in FIG. 13, but in the interlayer 12, an arrangement of the ultraviolet curing resin film made to be a film in advance and a coating film of an ultraviolet curing liquid resin composition is configured to be inverse.

A method of producing the above optical disk will be explained.

Figure 20A:
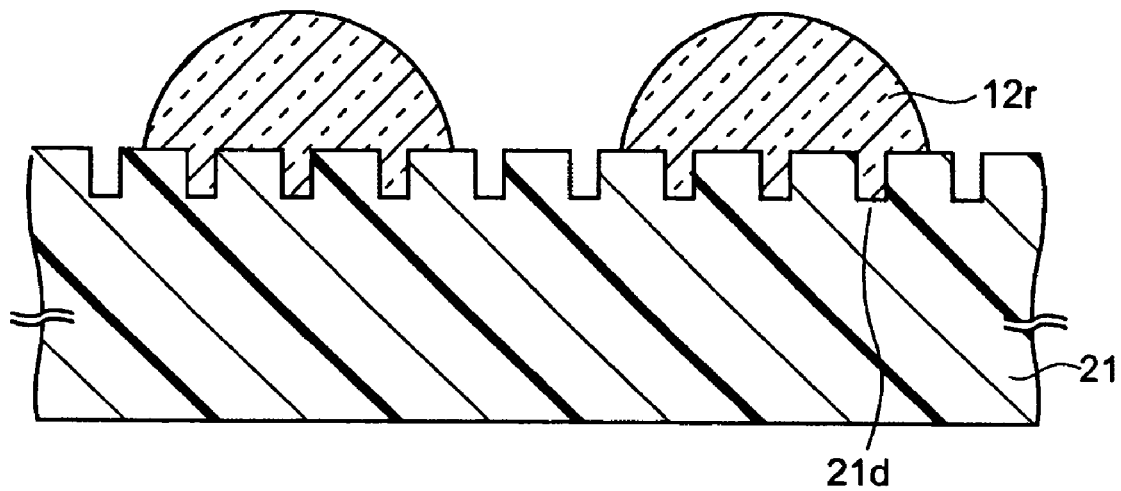
FIG. 20A and FIG. 20B are sectional views showing production processes of a method of producing an optical disk having another configuration according to the second embodiment.
Figure 20B:
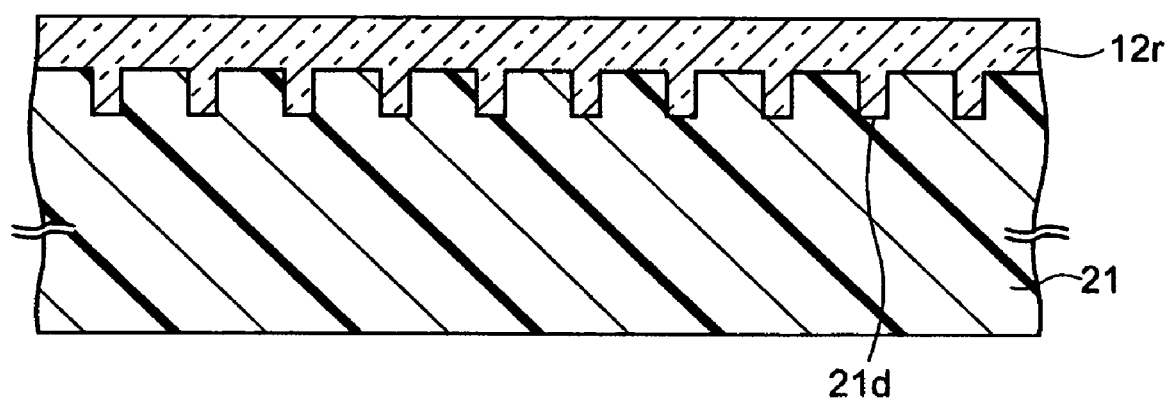

First, an ultraviolet curing liquid resin composition 12r is supplied on a transfer substrate 21, such as a resin stamper, having an uneven pattern including a concave portion 21d for a second optical recording layer as shown in FIG. 20A, and the liquid resin composition 12r is applied to be a uniform film thickness to form a coating film as shown in FIG. 20B by a spin-coat method of rotating a disk substrate 10.

Figure 21A:
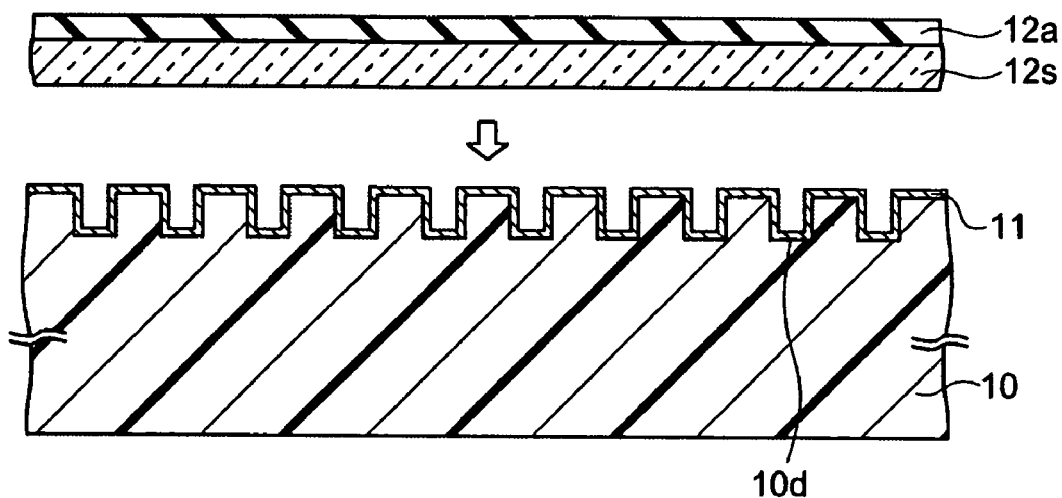
FIG. 21A and FIG. 21B are sectional views showing processes continued from FIG. 20B.

Next, the disk substrate 10 is formed in the same way as in the first embodiment, after forming a first optical recording film 11 thereon, as shown in FIG. 21A, a release film 12b on the light releasability side of a resin film 12s sandwiched by release films (12a and 12b) shown in FIG. 2 is released, and the first optical recording film 11 and the resin film 12s are adhered to each other by using a pad or a roller, etc.

Figure 21B:
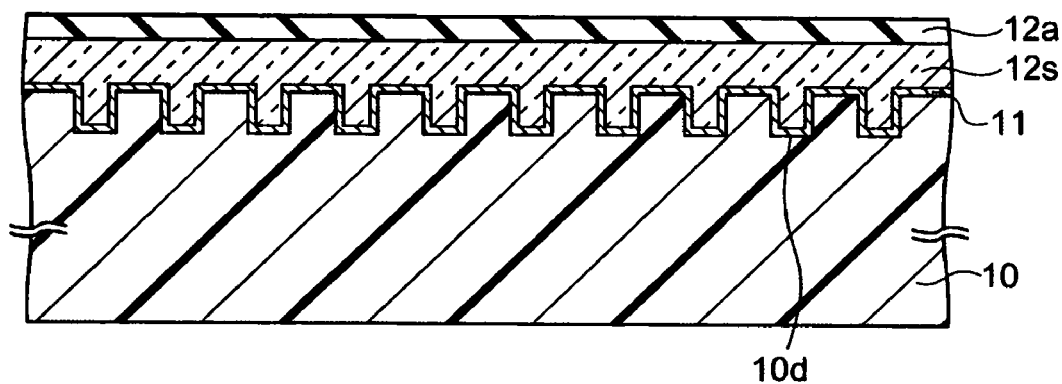

By adhering the transfer substrate 21 with sufficient strength, the state shown in FIG. 21B can be obtained.

Figure 22A:
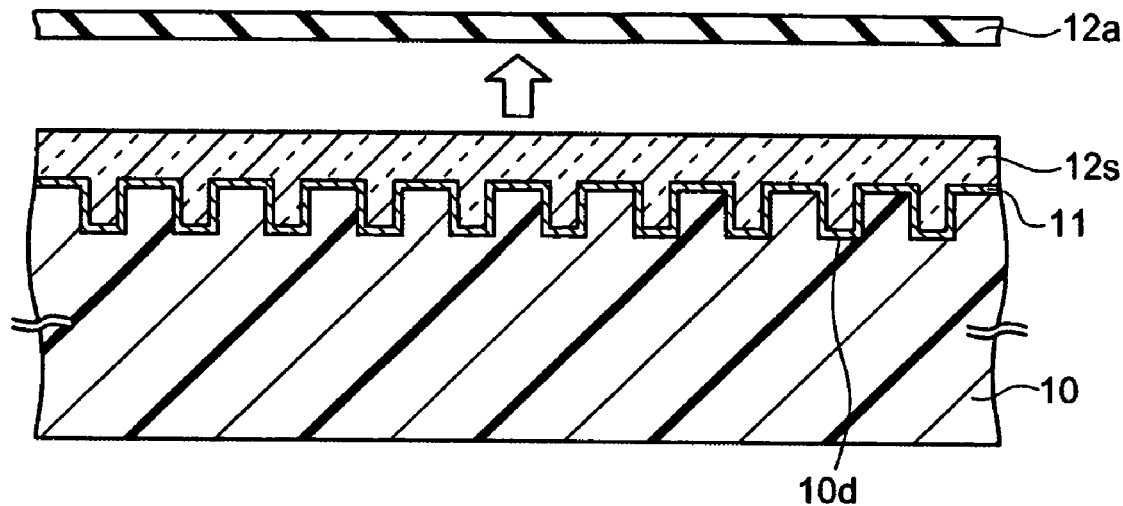
FIG. 22A and FIG. 22B are sectional views showing processes continued from FIG. 21B.

Next, as shown in FIG. 22A, the release film 12a on the heavy releasability side of the resin film 12s is released.

Figure 22B:
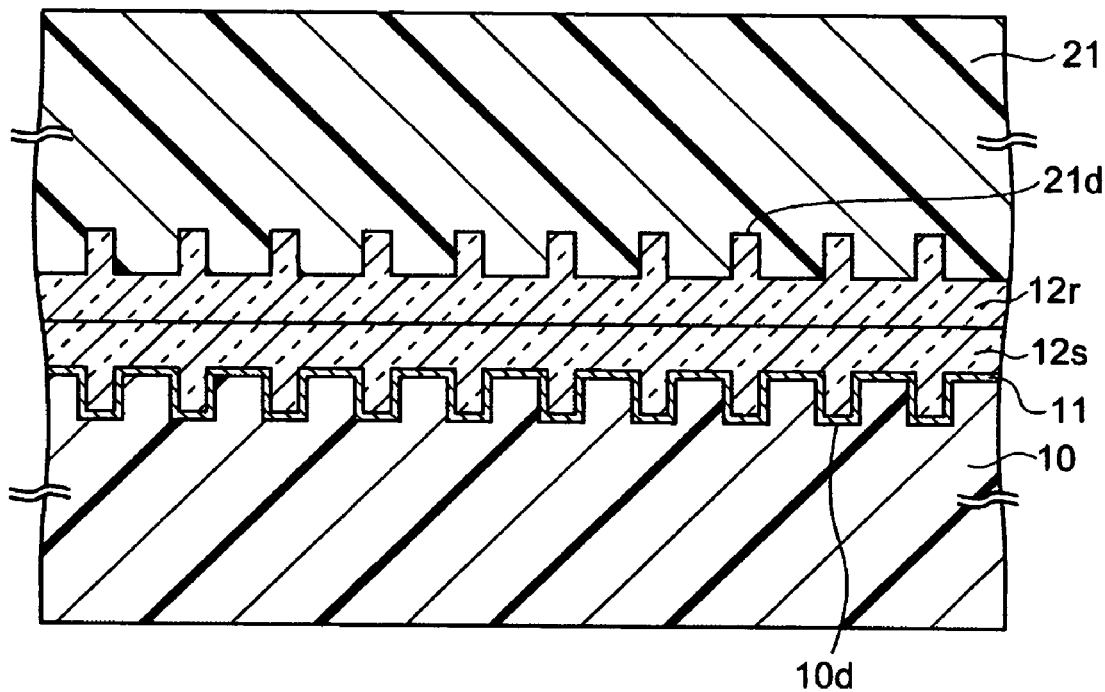

Next, as shown in FIG. 22B, the surface of the coating film of the liquid resin composition 12r and the surface of the resin film 12s are adhered to each other by using a pad or a roller, etc.

Figure 18B:
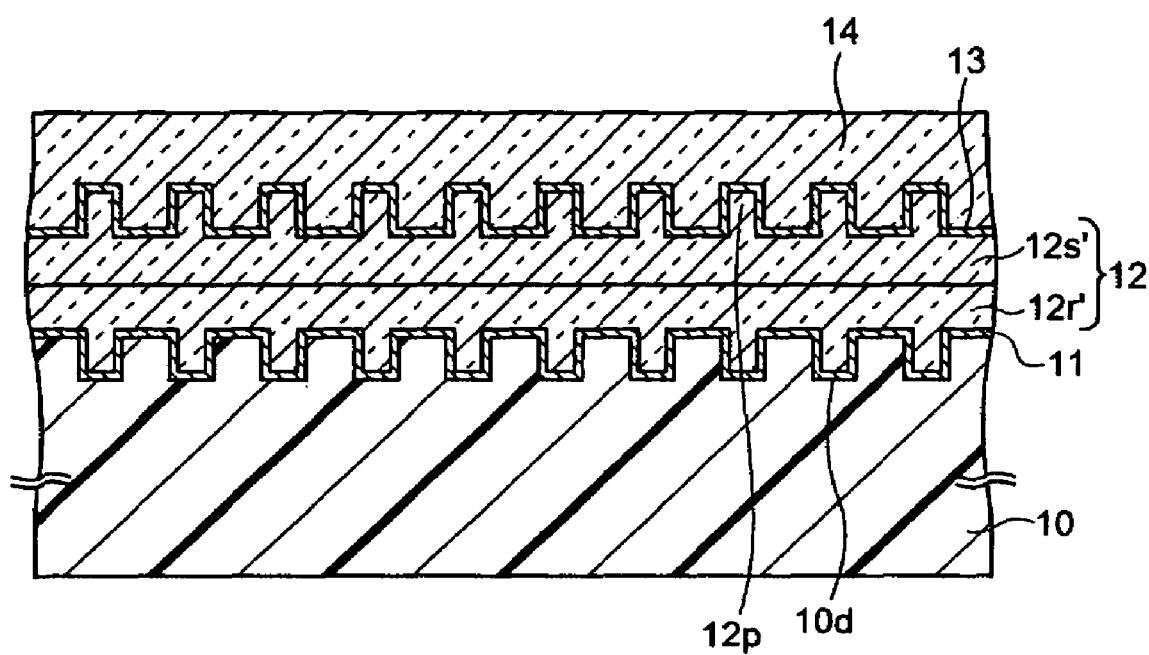

After that, in the same way as the above processes shown in FIG. 17 and FIG. 18, for example, an ultraviolet ray UV is irradiated from the transfer substrate 21 side to cure the resin film 12s and the coating film of the liquid resin composition 12r, the surface of the interlayer 12 and the transfer substrate 21 are separated on the boundary surface, the second optical recording film 13 is formed on the interlayer 12, and a light transmitting protective layer 14 is formed thereon.

From the above, an optical disk having a plurality of optical recording layers can be produced.

Also according to this method, by making a thickness of coating by spin-coat thin to five times as much as the film thickness irregularity and forming the rest of the thickness with the ultraviolet curing resin film, an interlayer having a little thickness irregularity can be formed. For example, when forming an interlayer of 20 µm, by applying a liquid resin of an amount of 5 µm and composing the rest amount of 15 µm with an ultraviolet curing resin film, total film thickness irregularity can be suppressed to ±1 µm or less.

Other than the above respective production methods, a liquid resin may be respectively applied to the disk substrate side and the transfer substrate side by performing spin-coating, and the two may be adhered to each other by providing a resin film between them.

In the above respective methods, the ultraviolet curing may be performed at a time after adhering to each other or may be performed successively.

It becomes a multilayer configuration also in this case, so that effects of improving properties of adhesiveness, releasability and transferability, etc. can be expected in addition to the film thickness in the same way as in the case of using the above stacked resin film.

Third Embodiment

A method of transferring with pressure by using a plastic substrate as the transfer substrate in the above first and second embodiments will be explained.

Figure 23:
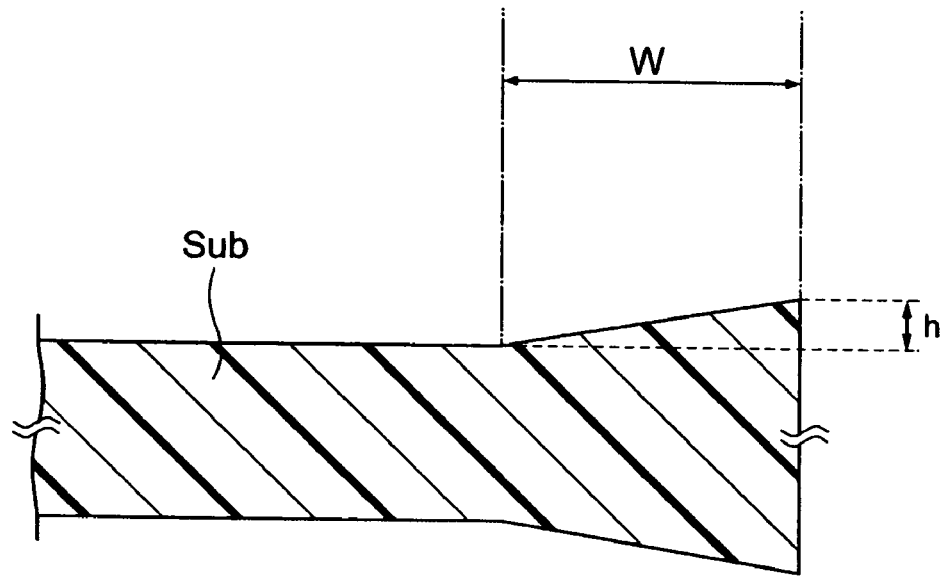
FIG. 23 is a partial sectional view showing the schematic configuration of a substrate, such as a disk substrate, formed by an injection molding.

FIG. 23 is a partial sectional view showing the schematic configuration of a substrate sub, such as a disk substrate formed by injection molding.

Generally, when forming a disk substrate by injection molding, the temperature becomes low at the outermost circumferential portion of the mold at the time of the injection molding, so that the substrate sub has trumpet-shaped bulge at the outermost circumference. The width is normally 2 to 3 mm and the height h is several µm to several tens of µm, which depend on an injection molding device and molding conditions.

Due to this shape, a clearance is liable to arise when adhering the disk substrate and the transfer substrate via an ultraviolet curing resin film.

Also, when an injection molded substrate is used also on the transfer substrate side, the trumpet-shape arises on the both sides of the disk substrate and the transfer substrate and leads to interference, so that a clearance is furthermore liable to arise.

When a clearance arises, it becomes necessary to eliminate or reduce it by defoaming by pressure under a high pressure (for example, 5 kg/cm² or more) for several seconds to several minutes and the processes become complicated.

Figure 24:
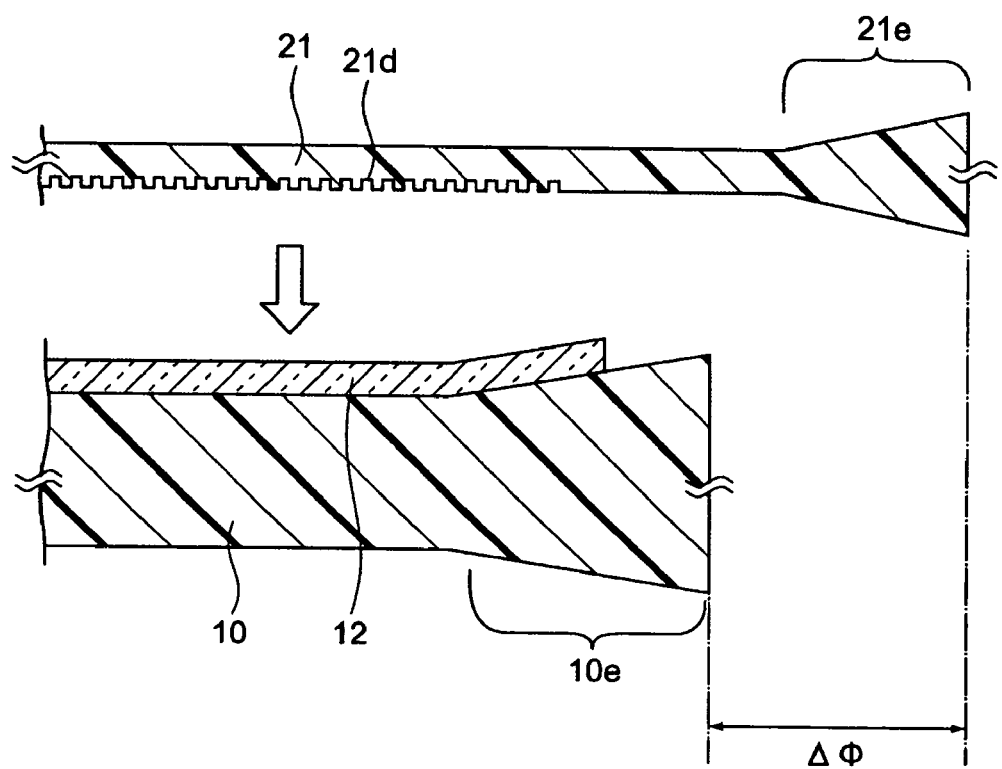
FIG. 24 is a sectional view showing production processes of a method of producing an optical disk according to a third embodiment.

Here, as shown in FIG. 24, when using the injection molded substrate on the transfer substrate 21 side, by making a size of the transfer substrate 21 larger by an amount of Δø than that of the disk substrate 10, interference of the trumpet shapes of the disk substrate and the transfer substrate can be reduced and generating clearances can be reduced.

Also, by making a size on the transfer substrate side large, there arises an advantage that it can be used as a holding portion at the time of releasing.

Also, by lowering rigidity of the transfer substrate, the transfer substrate can follow the trumpet shape of the outer circumferential portion of the disk substrate and clearances generated between the disk substrate and the transfer substrate can be reduced.

There is also a method of using a plastic material having a low rigidity, but it can be improved by simply making the thickness, for example, to 0.5 mm or less. The thinner, the less clearance arises, but when it is too thin, such as thinner than 0.3 mm, injection molding becomes difficult and handling becomes difficult.

Figure 25A:
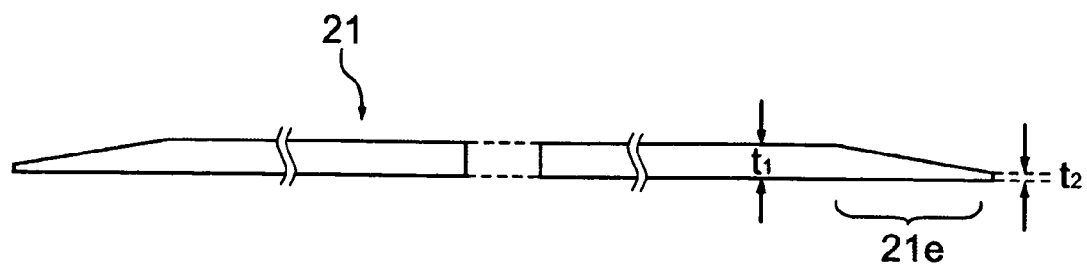
FIG. 25A and FIG. 25B are sectional views of a transfer substrate used in the third embodiment.
Figure 25B:
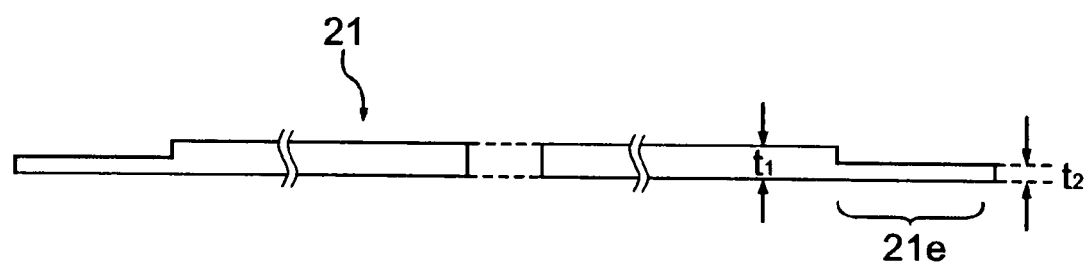
Figure 26:
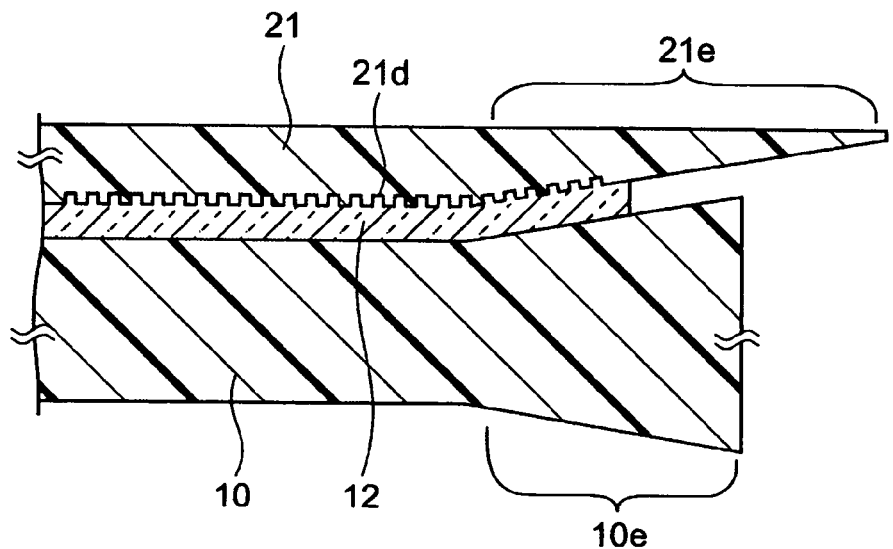
FIG. 26 is a sectional view showing production processes of a method of producing the optical disk according to the third embodiment.

Also, by making only the trumpet-shaped outermost circumferential portion 21e of the transfer substrate 21 thin to be a taper shape as shown in FIG. 25A, or by making only the trumpet-shaped outermost circumferential portion 21e of the transfer substrate 21 shaped to have a step as shown in FIG. 25B, and making the outer circumferential portion 21e of the transfer substrate 21 follow the trumpet shape of the outer circumferential portion 10e of the disk substrate 10, a clearance generated between the disk substrate and the transfer substrate can be reduced.

For example, a thickness $t_1$ at the center of the transfer substrate 21 is assumed to be 0.3 mm or so and a thickness $t_2$ of the outermost circumferential thin portion is 0.1 mm or so.

When the thickness of the transfer substrate 21 is made thin, a material composing the transfer substrate is required less, so it is advantageous in terms of costs.

Also, when the outermost circumferential portion 21e of the transfer substrate 21 is made to be a taper shape or a step shape, it is also possible to make only the outer circumferential portion thin and the center portion can be made thick to an extent of. not causing any troubles in carrying and handling, which are advantageous.

Also, as a method of bonding with pressure, it is preferable to use an elastic body capable of adhering even a taper shape and a step shape with pressure, so that the transfer substrate easily follows along the trumpet shape of the disk substrate. On the other hand, the disk is placed on a flat stage so as not to cause any warps, and the transfer substrate is put above to be adhered with pressure by a pad or a roller. A material of the pad and the roller, rubber can be used but may be any as far as it has elasticity. A pad shape to be used is flat, circular cone and spindle shape. An adhesive force can be changed in accordance with rubber hardness and adhesion strokes.

When using a thin transfer material or a taper shaped transfer material, it becomes significant that the optical disk substrate is placed on a flat stage and the transfer material able to be deformed is pressed with an elastic body.

Also, methods of making the outer circumference diameter size of the transfer material large, using a thin substrate, or making only an outer circumference thin may be used in combination.

EXAMPLE 1

An ultraviolet curing resin film was produced as below.

As an ultraviolet curing adhesive, 100 parts by weight of an ultraviolet curing resin composed of urethane acrylate based oligomer, 5 parts by weight of a photo-polymerization initiator and 5 parts by weight of isocyanate based curing agent were blended with respect to 100 parts by weight of an acryl adhesive composed of a copolymer of n-butyl acrylate and acrylic acid. The result was diluted with a solvent and applied on a release film by a roll-coater while mixing. As the release film, a PET (polyethylene terephthalate) film having a thickness of 38 µm subjected to silicone processing was used. A base material was obtained by laminating a PET (polyethylene terephthalate) film having a thickness of 38

µm wherein adhesiveness is made light after drying. The coater was adjusted so that the thickness becomes 20 µm after drying.

A multilayer optical disk was produced by using the above ultraviolet curing resin film as explained below.

A polycarbonate resin substrate having an outer circumference diameter ø of 120 mm, inner circumference diameter ø of 15 mm and a thickness of 1.1 mm formed with a relief pattern made by a pit on one side was used. Aluminum was formed thereon to 60 nm by sputtering and a first optical recording layer was formed.

Next, the above ultraviolet curing resin film is stamped out to be a donut shape having an outer circumference diameter ø of 119 mm and inner circumference diameter ø of 23 mm and adhered to the disk substrate by a roller after removing a release film on the light releasability side.

As a transfer substrate, an injection molded substrate having a thickness of 1.1 mm, an outer circumference diameter ø of 120 mm and inner circumference diameter ø of 15 mm composed of a cyclic polyolefin resin was used. The transfer substrate is formed with an uneven shape made by a pit for a second optical recording layer.

Next, the disk substrate is placed on a flat metal stage, the PET release film on the heavy releasability side was removed, then, the transfer substrate was bonded with pressure from above by a pad. As the pad, a spindle type rubber pad was used and a pressure was applied until allover the disk is pressed. The pressing force at the time was 5 kg/cm$^2$. After the bonding with pressure, the disk was subjected to defoaming processing by being placed under a pressure of 5 to 10 atms for 1 second to 5 minutes.

The ultraviolet curing resin film was cured by irradiating an ultraviolet ray from the transfer substrate, and the transfer substrate was released.

Next, aluminum is formed to be a film to have a film thickness of 9 nm by sputtering so as to be translucent, and the second optical recording layer was formed.

As a material of a light transmittance protective layer, the one laminated with a polycarbonate resin film having a thickness of 60 µm and an adhesive having a thickness of 20 µm in advance, and adhered with the PET (polyethylene terephthalate) release film on the adhesive side was used. The base material was stamped out to be a donut shape having an outer circumference diameter ø of 119 mm and inner circumference diameter ø of 23 mm, then, pressed by a spindle shaped pad and adhered. Furthermore, defoaming processing was performed by leaving the disk under a pressure of 5 to 10 atms for 1 second to 5 minutes.

An average thickness and thickness unevenness of the protective layer and interlayer of an optical disk produced as above were measured by a spectral interference method (the device name: ETA-Optik made by Steag Co.).

The measurement was made for every 2 mm from 24 to 56 mm on the disk radius and every 6 degrees in the circumferential direction of the disk. The result is shown. From this, it was confirmed that thickness irregularity of the interlayer of ±1 µm or less was realized.

TABLE 1

| Measurement Place | Average Thickness (µm) | Maximum Thickness Irregularity (±µm) |
| --- | --- | --- |
| Interlayer | 19.6 | 0.45 |
| Protective Layer | 80.2 | 0.52 |
| Interlayer + Protective Layer | 99.8 | 1.06 |

EXAMPLE 2

Two kinds of ultraviolet curing multilayer resin films were produced as below.

As an ultraviolet curing resin film (A) having weak adhesiveness to a polycarbonate resin, a copolymer having a weight-average molecular weight of 300000 composed of n-butyl acrylate and 2-hydroxy ethyl acrylate, a photo-curing copolymer obtained by reacting methacryloyloxy ethyl isocyanate with ethyl acetate solution, a copolymer having a weight-average molecular weight of 300000 composed of n-butyl acrylate and 2-hydroxy ethyl acrylate and a isocyanate based photopolymerization initiator are blended, and what obtained by applying the result in the above explained method, so that a thickness after drying becomes 10 µm was used.

Also, since a polycarbonate resin is used as a disk substrate, as an ultraviolet curing resin film (B) on the adhering side, 100 parts by weight of an ultraviolet curing resin composed of urethane acrylate based oligomer, 5 parts by weight of a photo-polymerization initiator and 5 parts by weight of isocyanate based curing agent were blended with respect to 100 parts by weight of an acryl based adhesive composed of a copolymer of n-butyl acrylate and acrylic acid, and what obtained by applying the result in the above explained method, so that the thickness after drying becomes 10 µm was used.

First, as a disk substrate, a polycarbonate resin substrate having an outer circumference diameter ø of 120 mm, inner circumference diameter ø of 15 mm and a thickness of 1.1 mm formed with an uneven shape made by a pit on one side was used. Aluminum film was formed thereon to be 60 nm by sputtering and a first optical recording layer was formed.

Next, the above ultraviolet curing resin film (B) was stamped out to be a donut shape having an outer circumference diameter ø of 119 mm and inner circumference diameter ø of 23 mm and adhered to the disk substrate by a roller after removing a release film on the light releasability side.

As a transfer substrate, a polycarbonate resin substrate having an outer circumference diameter ø of 120 mm, inner circumference diameter ø of 15 mm, and a thickness of 1.1 mm formed with an uneven shape to be a pit on one side was used. The ultraviolet curing resin film (A) was stamped out to be a donut shape having an outer circumference diameter ø of 119 mm and an inner circumference diameter ø of 23 mm and adhered thereon by a roller after removing a release film on the light releasability side. After removing both of the release films on the disk substrate and transfer substrate, the result was pressed by a spindle shaped pad to be adhered.

Furthermore, after performing defoaming processing by leaving under a pressure of 5 to 10 atms for 1 second to 5 minutes or so, an ultraviolet ray was irradiated from the transfer substrate side, and the ultraviolet curing films (A) and (B) were cured at a time.

Next, when separating the transfer material from the optical disk substrate, the releasing was always performed on the boundary of the ultraviolet curing resin film (A) and the transfer substrate.

After that, an aluminum film was formed by sputtering so as to be a translucent and a second optical recording layer was formed.

Finally, a light transmitting protective layer was produced in the same way as in the above method, and a multilayer optical disk was obtained.

An average thickness and thickness irregularity of the protective layer and interlayer of the optical disk produced as above were measured on this disk by a. spectral interference method in the same way.

From this, it was confirmed that thickness irregularity of the interlayer of ±1 μm or less was attained even when the interlayer configuration became two layers.

TABLE 2

| Measurement Place | Average Thickness (μm) | Maximum Thickness Irregularity (±μm) |
| --- | --- | --- |
| Interlayer | 19.6 | 0.78 |
| Protective Layer | 80.3 | 0.46 |
| Interlayer + Protective Layer | 99.9 | 1.20 |

EXAMPLE 3

A multilayer disk wherein an interlayer was composed of a resin film of an ultraviolet curing adhesive and an ultraviolet curing resin applied with. spin-coating was produced as below.

An ultraviolet curing adhesive was used as the ultraviolet curing resin film. What obtained by blending 100 parts by weight of an ultraviolet curing resin made by urethane acrylate based oligomer, 5 parts by weight of photo-polymerization initiator and 5 parts by weight of an isocyanate based curing agent with respect to 100 parts by weight of acryl based adhesive composed of a copolymer of n-butyl acrylate and acrylic acid is applied to be a thickness of 17 μm in the above explained method.

As an optical disk substrate, a polycarbonate resin substrate having an outer circumference diameter ø of 120 mm, inner circumference diameter ø of 15 mm, and a thickness of 1.1 mm formed with an uneven shape to be a pit on one side was used. An aluminum film was formed to have a film thickness of 60 nm by sputtering thereon so as to form a first optical recording layer.

Next, the ultraviolet curing resin film was stamped out to be a donut shape having an outer circumference diameter ø of 119 mm and inner circumference diameter ø of 23 mm and adhered to the disk substrate by a roller after removing a release film on the light releasability side.

As a transfer substrate, an injection molded substrate made by a cyclic polyolefin resin having a thickness of 1.1 mm, an outer circumference diameter ø of 120 mm and an inner circumference diameter ø of 15 mm was used. The transfer substrate was formed with an uneven shape to be a pit for a second optical recording layer.

On the surface of the transfer substrate is applied with an acryl based ultraviolet curing resin (for example, T-695/UR506-4 made by Nagase Chiba) in a pattern of a ring shape at a position of a radius of 10 to 20 mm and spin-coating was performed. The rotation rate was 5000 rpm and the rotation time was adjusted so that the thickness at the outermost circumference becomes 3 μm.

Next, an optical disk substrate is placed on a flat metal stage, and after removing a PET release film on the heavy releasability side, the transfer substrate provided with a coating film of an ultraviolet curing resin was adhered with pressure from above by a pad. Furthermore, after performing defoaming processing by leaving under a pressure of 5 to 10 atms for 1 second to 5 minutes or so, an ultraviolet ray was irradiated from the transfer substrate side to cure the ultraviolet curing resin film and the ultraviolet curing resin coating film at a time.

After that, an aluminum film was formed by sputtering so as to be translucent and a second optical recording film was formed. Finally, a light transmitting protective layer was prepared in the same way as the above explained method and a multilayer optical disk was obtained.

An average thickness and thickness irregularity of the protective layer and interlayer of the optical disk produced as above were measured on the optical disk by a spectral interference method. Also in this case, it was possible to make the thickness irregularity of the interlayer to be ±1 μm or less.

TABLE 3

| Measurement Place | Average Thickness (μm) | Maximum Thickness Irregularity (±μm) |
| --- | --- | --- |
| Interlayer | 19.1 | 0.89 |
| Protective Layer | 79.9 | 0.41 |
| Interlayer + Protective Layer | 99.0 | 1.38 |

EXAMPLE 4

To avoid interference by a trumpet shape at the outer circumferential portion of the transfer substrate, a cyclic polyolefin resin substrate having an outer circumference diameter ø of 128 mm, inner circumference diameter ø of 15 mm, and a thickness of 1.1 mm formed with an uneven shape to be a pit on one side was used as a transfer substrate.

As a disk substrate, a polycarbonate resin substrate having an outer circumference diameter ø of 120 mm, inner circumference diameter ø of 15 mm, and a thickness of 1.1 mm formed with an uneven shape to be a pit on one side was used.

After adhering an ultraviolet curing resin film having a thickness of 20 μm on the disk substrate, the disk substrate was placed on a flat metal stage, and after a PET release film on the heavy releasability side was removed, the transfer substrate was adhered with pressure from above by a pad. As the pad, spindle type rubber pad was used and pressure was applied until allover the disk was pressed. It was confirmed that the thus obtained disk had almost no bubbles left at the outer circumference by performing pressure defoaming.

EXAMPLE 5

Next, an optical disk was produced in the same way as the above by using a transfer substrate wherein the thickness was made thin.

As the transfer substrate, a cyclic polyolefin resin substrate having an outer circumference diameter ø of 120 mm, inner circumference diameter ø of 15 mm, and a thickness of 0.35 mm formed with an uneven shape to be a pit on one side was used.

As a disk substrate, a polycarbonate resin substrate having an outer circumference diameter ø of 120 mm, inner circumference diameter ø of 15 mm, and a thickness of 1.1 mm formed with an uneven shape to be a pit on one side was used.

After adhering an ultraviolet curing resin film having a thickness of 20 μm on the disk substrate, the optical disk as a transfer substrate was placed on a flat metal stage, and after a PET release film on the heavy releasability side was removed, the transfer substrate was adhered with pressure from above by a pad.

As the pad, spindle type rubber pad was used and pressure was applied until allover the disk was pressed. It was confirmed that the thus obtained disk had almost no bubbles left at the outer circumference by performing pressure defoaming.

EXAMPLE 6

Next, only a shape of the outermost circumference of the transfer substrate was made thin. An outer circumference diameter ø was 120 mm, the inner circumference diameter ø was 15 mm, a thickness near the center was 0.6 mm, the plate thickness gradually became thinner from the position of the radius of 45 mm, and the plate thickness at the position of the radius of 60 mm, the outermost circumference, was 0.2 mm. This taper shape was formed on the opposite side of the surface formed with the uneven shape to be a pit, and a cyclic polyolefin resin was used as a transfer substrate material.

The disk substrate had an outer circumference diameter ø of 120 mm, inner circumference diameter ø of 15 mm, and a thickness of 1.1 mm and an uneven shape made by a pit formed on its one side.

After adhering an ultraviolet curing resin film having a thickness of 20 μm on the disk substrate, the optical disk as a transfer substrate was placed on a flat metal stage, and after a PET release film on the heavy releasability side was removed, the transfer substrate was adhered with pressure from above by a pad.

As the pad, spindle type rubber pad was used and pressure was applied until allover the disk was pressed. It was confirmed that the thus obtained disk had almost no bubbles left at the outer circumference by performing pressure defoaming.

According to the multilayer optical disk and the production method of the present embodiment, advantages below can be obtained.

By using an ultraviolet curing resin film as the interlayer, film thickness irregularity of the interlayer can be suppressed small, so that a multilayer disk capable of stably recording and reproducing can be provided.

By using an ultraviolet curing resin film as the interlayer, film thickness irregularity of the interlayer can be suppressed small, so that a multilayer optical disk having two or more optical recording layers can be provided.

By forming the interlayer by two or more kinds of ultraviolet curing resin films, a wide range of materials can be used as a material of the transfer substrate.

By forming the interlayer by two or more kinds of ultraviolet curing resin films, an interlayer having good transferability and a suppressed shrinking percentage can be provided.

By combining an ultraviolet curing resin coating film, wherein the thickness is made thinner than that in the case of being used alone, and an ultraviolet curing resin film, film thickness irregularity of the interlayer. can be suppressed and the same effects can be obtained as in the case of using two or more layers of ultraviolet curing resin films.

When using a substrate made by an injection molded plastic material as the transfer substrate, preferable transfer can be performed by making the outer circumference diameter of the transfer substrate larger than that of the optical disk substrate.

When using a transfer substrate made by a plastic material, good transferability can be obtained to the outer circumference by making the thickness of the transfer substrate to as thin as 0.5 mm or less.

When using a transfer substrate made by a plastic material, good transferability can be obtained to the outer circumference by making the outermost circumferential portion of the transfer substrate thin.

Also, other than being able to suppress the film thickness irregularity of the interlayer as explained above, the influence of warps of the transfer substrate, arising of problems due to dusts and burrs can be also suppressed by using an ultraviolet curing resin film as the interlayer.

The present invention is not limited to the above embodiments.

For example, as the optical recording layer, other than a reflection film of aluminum, etc., other variety of optical recording layers of a phase change type recording material, etc. can be used.

Also, it can be applied to an optical recording medium having three or more optical recording layers.

Other than the above, a variety of modifications can be made within the scope of the present invention.

According to the present invention, a plurality of optical recording layers are provided, wherein film thickness irregularity of interlayer between the optical recording layers can be suppressed, furthermore, the influence of warps of the transfer substrate, arising of problems due to dusts and burrs can be also suppressed.

INDUSTRIAL APPLICABILITY

The present invention can deal with memory formats of a rewritable type, etc. having an optical recording layer using as a recording material a phase change type material, magneto-optical recording material or recording material containing organic dye, etc. and can be used for an optical disk capable of realizing a large capacity file at a low cost and the production method thereof.

The invention claimed is:

1. An optical recording medium, wherein at least two optical recording layers are stacked with an interlayer therebetween; and wherein
said interlayer is comprised of at least one substantially uniform layer of ultraviolet curing resin film that is formed on a separate matarerial layer prior to contacting either of the optical recording layers.

2. An optical recording medium as set forth in claim 1, wherein said interlayer is a film obtained by curing a stacked structure including at least one layer of ultraviolet curing resin film and at least one layer of a coating film of an ultraviolet curing liquid resin composition.

3. An optical recording medium as set forth in claim 1, wherein an uneven shape corresponding to a recording pit or a guide groove is formed into said interlayer.

4. An optical recording medium as set forth in claim 2, wherein an uneven shape corresponding to a recording pit or a guide groove is formed into said coating film of an ultraviolet curing liquid resin composition.

5. An optical recording medium, wherein at least two optical recording layers are stacked with an interlayer therebetween; and wherein
said interlayer is comprised of at least one layer of ultraviolet curing resin film that is formed on a separate material layer prior to contacting either of the optical recording layers, the layer of ultraviolet curing resin having a thickness variation of less than +/−1 μm.

6. An optical recording medium, wherein at least two optical recording layers are stacked with an interlayer therebetween; and wherein
said interlayer is comprised of at least one layer of ultraviolet curing resin film that is approximately 75% or more of a total thickness for the interlayer, the remaining portion of the interlayer being substantially comprised of liquid resin.

7. The optical recording medium according to claim 6, wherein said interlayer has a thickness variation of less than +/−1 μm.

* * * * *